United States Patent
Sharma et al.

(10) Patent No.: US 9,491,626 B2
(45) Date of Patent: Nov. 8, 2016

(54) ENHANCED DATA INTERFACE FOR CONTACTLESS COMMUNICATIONS

(71) Applicant: Visa International Service Association, SF, CA (US)

(72) Inventors: Sanjeev Sharma, Sunnyvale, CA (US); Oleg Makhotin, Castro Valley, CA (US); Christian Aabye, Foster City, CA (US)

(73) Assignee: Visa Intellectual Service Association, San Francisco, CA (US)

( * ) Notice: Subject to any disclaimer, the term of this patent is extended or adjusted under 35 U.S.C. 154(b) by 6 days.

(21) Appl. No.: 14/706,818

(22) Filed: May 7, 2015

(65) Prior Publication Data

US 2015/0327071 A1 Nov. 12, 2015

Related U.S. Application Data

(60) Provisional application No. 61/989,523, filed on May 7, 2014.

(51) Int. Cl.
*H04L 29/06* (2006.01)
*H04W 12/08* (2009.01)
(Continued)

(52) U.S. Cl.
CPC ............ *H04W 12/08* (2013.01); *H04L 63/102* (2013.01); *H04L 63/126* (2013.01); *H04W 12/12* (2013.01); *G06Q 20/32* (2013.01)

(58) Field of Classification Search
CPC .. H04W 12/08; H04W 12/12; H04L 63/126; H04L 63/102; G06Q 20/32
See application file for complete search history.

(56) References Cited

U.S. PATENT DOCUMENTS 8,811,892 B2   8/2014 Khan et al.
2005/0222961 A1*  10/2005 Staib .................... G06Q 20/327
                                                          705/64

(Continued)

FOREIGN PATENT DOCUMENTS

KR   1020140029048   3/2014

OTHER PUBLICATIONS

Aigner et al. "A system of secure virtual coupons using NFC technology." Retrieved from http://ieeexplore.ieee.org/stamp/stamp.jsp?tp=&arnumber=4144858 , Pervasive Computing and Communications Workshops, 2007. PerCom Workshops' 07. Fifth Annual IEEE International Conference on. IEEE, 2007.*

(Continued)

*Primary Examiner* — Chau Le
*Assistant Examiner* — Muhammad Chaudhry
(74) *Attorney, Agent, or Firm* — Kilpatrick Townsend & Stockton LLP

(57) ABSTRACT

Embodiments of the invention are directed at an enhanced data interface (EDI) for contactless communications between a mobile application operating on a mobile device and an access device (e.g., contactless reader) that allows for enhanced verification between the mobile device and access device. One embodiment of the invention is directed to a method. The method comprises a mobile device receiving a request for available applets from an access device and providing a list of available applets including trusted applet identifiers and untrusted applet identifiers to the access device. The method further comprises receiving a selection of an untrusted applet identifier from the list and an entity identifier associated with the access device, validating that the access device is authorized to access credentials associated with the selected untrusted applet identifier using the entity identifier, and providing the credentials associated with the selected untrusted applet identifier to the access device.

15 Claims, 10 Drawing Sheets

(51) Int. Cl.
*H04W 12/12* (2009.01)
*G06Q 20/32* (2012.01)

(56) References Cited

U.S. PATENT DOCUMENTS

| | | |
|---|---|---|
| 2011/0271331 A1 | 11/2011 | Adams |
| 2012/0109764 A1 | 5/2012 | Martin et al. |
| 2013/0125231 A1 | 5/2013 | Kuenzi |
| 2013/0212660 A1 | 8/2013 | Neafsey |
| 2013/0282459 A1 | 10/2013 | Smets et al. |
| 2013/0297509 A1 | 11/2013 | Sebastian et al. |
| 2013/0317924 A1 | 11/2013 | Bush et al. |
| 2014/0025567 A1 | 1/2014 | Rigby et al. |
| 2014/0143137 A1* | 5/2014 | Carlson ............... G06Q 20/02 705/39 |
| 2014/0158759 A1 | 6/2014 | Smets et al. |

OTHER PUBLICATIONS

Ergeerts et al. "Vision towards an Open Electronic Wallet on NFC Smartphones." Retrieved from https://securewww.esat.kuleuven.be/cosic/publications/article-2288.pdf , International Journal on Advances in Internet Technology5.3&4 (2012): 84-94.*
PCT International Search Report in connection with PCT Application No. PCT/US2015/029767 dated Jul. 28, 2015, 13 pages.

* cited by examiner

ENHANCED DATA INTERFACE FOR CONTACTLESS COMMUNICATIONS

CROSS-REFERENCES TO RELATED APPLICATIONS

This application claims the benefit of priority to and is a Non-Provisional application of U.S. Provisional Application No. 61/989,523, filed on May 7, 2014, which is hereby incorporated by reference in its entirety for all purposes.

BACKGROUND

Technology has been developed to allow for more access to contactless communication interfaces by merchants and other application developers that were previously not allowed to design and develop mobile applications configured to provide payment capabilities using contactless communication (e.g., Near-field Communications hardware). Thus, merchant are developing payment applications that are capable of offering additional services to consumers using contactless or near-field communication (NFC) interfaces that were previously out of reach.

However, along with the increase in mobile payment application development, there has been an expansion in attempts by fraudsters to use mobile payment applications maliciously. For example, as the mobile device payment ecosystem has expanded, mobile devices (e.g., phones) have been used by fraudsters to perform fraudulent transactions by stealing credit cards and adding stolen account details to unauthorized phones. Traditionally, application developers integrated account issuer systems into an account provisioning or account enrollment process such that an account issuer agreed to the provisioning and/or verified the account before adding account details to a mobile payment application. This allowed an account issuer to know whether an account is being added to an unknown phone and/or otherwise determine if activities on an account indicate that the account is being used fraudulently. Thus, issuers could decline a request or otherwise authenticate a user before allowing the account to be added to the phone. However, as new merchant application developers and issuers embrace the mobile ecosystem, integrating every one of the millions of merchant systems (or other application developers) with every one of the hundreds of issuer systems to get approval before cards are provisioned on a phone to ensure the card is legitimately added to the phone has become unduly burdensome and technically difficult.

As such, many application developers have allowed accounts to be added to their mobile payment applications without verifying or obtaining approval from account issuers. Thus, because issuers are not contacted during account provisioning, fraudsters may be capable of provisioning account data into a phone that otherwise would be denied by an issuer.

Further, many mobile application developers have not informed relying parties (e.g., merchants) during transactions that such accounts added to the application have not been verified by an issuer. As such, the relying parties have no means for knowing whether an account has been verified prior to a transaction being initiated. Thus, relying parties do not know whether to trust the account information they receive during mobile payment transactions. Accordingly, there is a need to allow for unverified account information to be used in a transaction initiated by a mobile payment application without creating security concerns for relying transaction parties.

Embodiments of the invention address these and other problems, individually and collectively.

SUMMARY

One embodiment of the invention is directed to a method. The method comprises a mobile device receiving a request for available applets from an access device and providing a list of available applets including trusted applet identifiers and untrusted applet identifiers to the access device. The method further comprises receiving a selection of an untrusted applet identifier from the list and an entity identifier associated with the access device, validating that the access device is authorized to access credentials associated with the selected untrusted applet identifier using the entity identifier, and providing the credentials associated with the selected untrusted applet identifier to the access device.

Another embodiment of the invention is directed to a method. The method comprises sending a request for available applets to a mobile device and receiving a list of available applets including trusted applet identifiers and untrusted applet identifiers. The list of available applets including a wallet identifier for each of the available applets that identifies a mobile application that is associated with each of the available applets. The method further comprises determining supported applet identifiers from the list of available applets, determining that a highest priority applet of the supported applet identifiers includes an untrusted applet identifier, and validating that the wallet identifier is associated with a trusted entity before selecting the untrusted applet from the list. The method further comprises providing a selection of the untrusted applet identifier from the list and receiving credentials associated with the selected untrusted applet identifier from the mobile application of the mobile device.

Another embodiment of the invention is directed to a system. The system comprises a mobile device and an access device. The mobile device is configured to receive a request for available applets from an access device, provide a list of available applets including trusted applet identifiers and untrusted applet identifiers to the access device, receive a selection of an untrusted applet identifier from the list and an entity identifier associated with the access device, validate that the access device is authorized to access credentials associated with the selected untrusted applet identifier using the entity identifier, and provide the credentials associated with the selected untrusted applet identifier to the access device. The access device is configured to send the request for available applets to the mobile device, receive the list of available applets including the trusted applet identifiers and the untrusted applet identifiers, provide the selection of the untrusted applet identifier from the list, and receive credentials associated with the selected untrusted applet identifier from the mobile application of the mobile device.

These and other embodiments of the invention are described in further detail below.

DETAILED DESCRIPTION

Figure 1:
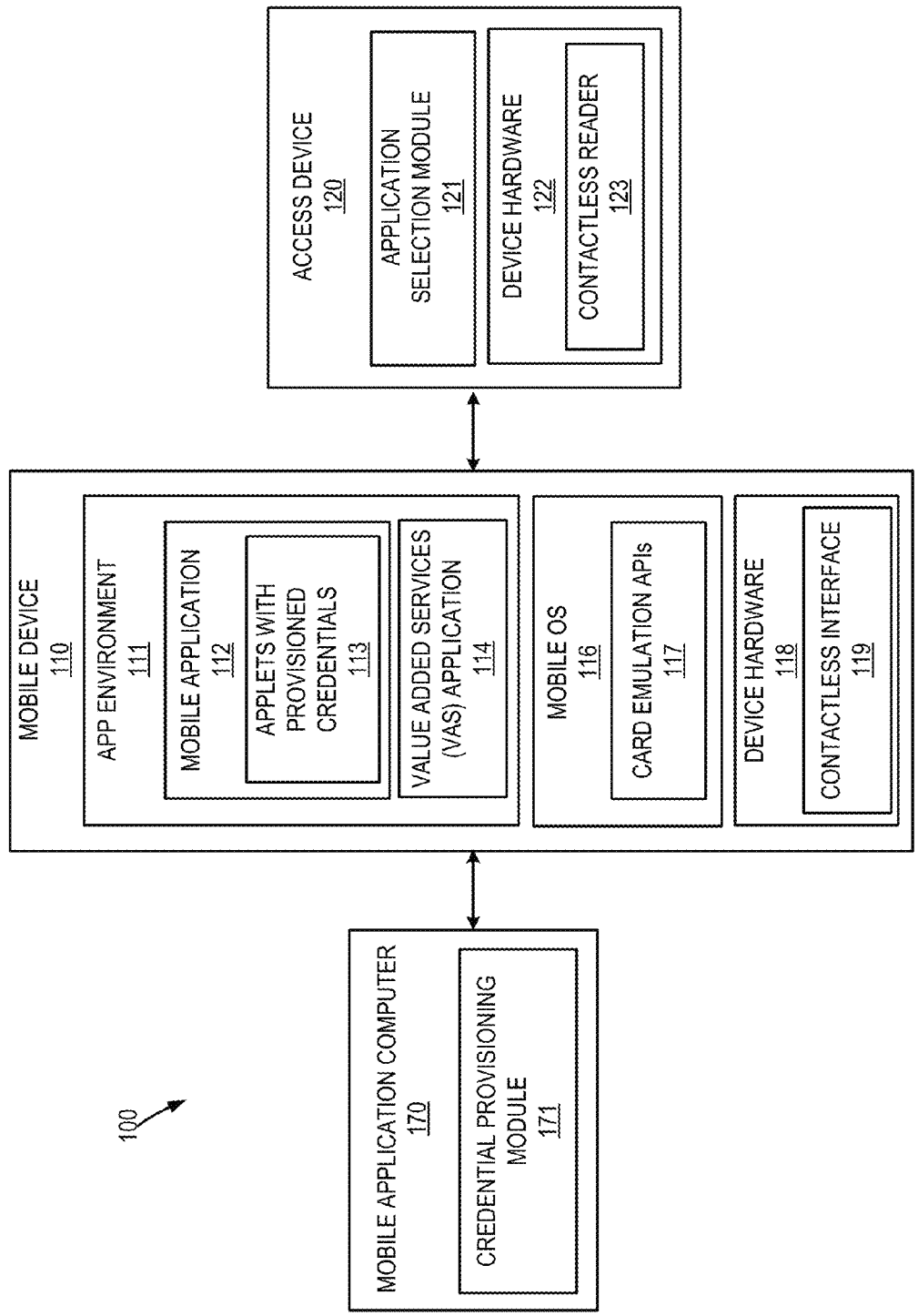
FIG. 1 illustrates an exemplary block diagram of an enhanced data interface system, according to one embodiment of the present invention.

Embodiments of the invention are directed to methods, systems, apparatuses, and computer-readable mediums for an enhanced data interface (EDI) that provides enhanced communication mechanisms between a mobile device and a merchant access device during contactless (or other short-range communication) transactions. The EDI provides additional data validation, authentication, and payment processing controls during contactless transactions (also referred to as proximity or short-range communication transactions).

Merchants are developing and providing their own mobile applications (i.e., "mobile applications") to consumers that provide additional value-added services (VAS) capabilities including additional loyalty, coupon, and transaction tracking interactions with consumers. Additionally, the mobile applications allow for enrollment of consumer accounts (e.g., credit cards, debit cards, etc.) to facilitate transaction processing using the mobile application. In order to avoid fraudulent transactions and ensure that an account is legitimate, mobile application providers typically obtain an account issuer's approval before adding accounts to their mobile applications. However, it is difficult for merchants to integrate every issuer in order to obtain verification before allowing an account to be provisioned to a mobile application on a device.

For example, a merchant (e.g., "Merchant A") may develop a mobile application (or mobile wallet application) for a consumer mobile device (e.g., mobile phone) to be used during transactions at their locations (e.g., "Merchant A" point-of-sale (POS) devices). The mobile application may allow users to enroll account information (e.g., credit card information) on their phone through the application that can be used to pay for purchases made at the merchant. However, because there are thousands of issuers and millions of merchants that exist, it is onerous and technically difficult for each merchant application developer to integrate every issuer system to validate an account before adding or provisioning the account credentials through the mobile application. Thus, the merchant may allow consumers to add accounts (i.e., credit cards) to their phone through their mobile application without requiring each and every issuer to authenticate and approve of the card being added to the mobile application. For instance, the merchant may obtain approval from the largest account issuers (i.e., a national bank) but may not validate account data for smaller issuers (i.e., a local bank) that have fewer customers, less sophisticated computer systems, or that are otherwise more difficult to integrate with their systems.

However, because the merchant has not validated the account with an issuer before adding the card account to the mobile application, the mobile application may determine that the card data is "untrusted" or has not been validated. These account credentials may be categorized as "untrusted accounts" when added through the mobile application and may have additional access restrictions than trusted accounts (i.e., issuer validated accounts). Thus, the mobile application and a POS terminal relying on the "untrusted accounts" may treat the non-validated or un-approved card account data added to the device differently than account data that has been validated/approved by an account issuer.

For example, the mobile application may only allow card accounts that have not been validated by the issuer to be used at the mobile application developer's (e.g., "Merchant A" Mobile App) merchant locations (e.g., "Merchant A" locations). Accordingly, a mobile application may determine which merchant they are located at and may determine whether the payment credentials are allowed to be used at that merchant before allowing a transaction to be initiated.

Similarly, a merchant access device (e.g., POS terminal) may determine the status of the account data available on a mobile device and may verify the identity of the mobile application developer or owner of the mobile application before they accept untrusted card data for a transaction because an issuer of the account has not validated the card. Accordingly, the mobile application may provide a different identifier for trusted accounts and untrusted accounts stored on the mobile device whenever such account information is being passed to a merchant for a transaction.

For example, "Merchant A" may be allowed to initiate a transaction using untrusted account credentials provisioned through their "Merchant A" mobile application because they are responsible for allowing that information to be enrolled, they control the relationship with the consumer, and they may be held responsible for any fraudulent transactions associated with the untrusted account credentials. However, "Merchant A" may not allow account information enrolled in a different merchant's mobile application (e.g., "Merchant B") to be used at their location. Thus, if a consumer attempted to perform a transaction using untrusted account credentials that were added through a "Merchant B" mobile application at a "Merchant A" location, the POS of "Merchant A" may not accept untrusted account credentials from the "Merchant B" mobile application. Therefore, the mobile application and the merchant POS may determine the entity associated with the POS terminal and the mobile application, respectively, in order to limit the use of the untrusted account credentials.

Thus, the EDI uses the additional information to facilitate additional functionality and provide additional advantages over previous contactless communication interfaces. For example, the EDI provides (i) merchant POS validation by a mobile application, (ii) mobile application validation by a merchant POS, and (iii) provides for selection and integration of uniform value added services (VAS) within a contactless communication protocol.

For instance, in order to ensure a mobile application is not used at other merchants and to protect the consumer information stored on the mobile application (e.g., enrolled account information, transaction history, etc.), the merchant application may only allow transactions and other communications with a merchant access device that is associated with the merchant. Accordingly, the merchant application may request an entity identifier (e.g., a merchant identifier (MID)) during a contactless communication session with a merchant access device (e.g., POS) and may validate that the merchant access device is operated by an entity that is trusted by the merchant application.

For example, a mobile application may request a merchant identifier (MID) in a select AID response processing options data object list (PDOL) message. The merchant access device (e.g., POS reader) may then send a pre-assigned MID in a get processing options (GPO) request command. A mobile application may then check whether the MID is authorized to receive card data from the mobile application. If a merchant access device (e.g., POS reader) does not support EDI, the reader may not a MID in the GPO Request and the Mobile Application (MA) may treat the reception of no MID, as an invalid MID condition. Furthermore, in some embodiments, a mobile application implements MID checking logic if a reader selects an untrusted applet identifier (UAID), while the MID check is optional if a reader selects a trusted applet identifier (TAID).

Thus, some embodiments allow mobile applications to validate the identity of an owner or operator of an access device before allowing the access device to obtain sensitive information from an account applet. Accordingly, the security of the contactless transaction is increased over pre-existing contactless interactions because a mobile application can validate the identity of the access device before providing any potentially sensitive information.

Additionally, in some embodiments, merchants receiving payment credentials during contactless transactions may want to validate the identity of a mobile application being used by consumer to initiate a transaction before allowing the transaction to be processed. The POS may validate the mobile application for every type of transaction or may validate the mobile application where a consumer has shown the intent to use untrusted account credentials. For example, a merchant POS may initiate transactions using untrusted account credentials only if a consumer is using a merchant authorized mobile application (e.g., an application developed by the merchant or a partner).

Accordingly, a merchant location may validate the wallet developer of a wallet during a contactless transaction. For example, a merchant may check a Wallet ID (WID) of a payment application and an AID of the account applet for a payment. The mobile application may send the WID in a PPSE response. The PPSE response also includes the AIDs of trusted and untrusted account applets that the consumer selected for payment. Thus, the merchant access device may be aware of available cards for use in the transaction and the identity of the payment application being used in a transaction.

Additionally, because merchants only have access to data passed through their wallet, the merchant accepting the payment may not receive the consumer information associated with the transaction because they do not have access to the merchant application. Accordingly, a merchant may desire to limit the use of other merchant applications at their locations. Therefore, a merchant application may be limited to merchant access devices associated with the merchant location. Alternatively and additionally, if the merchant wallet is a multi-merchant wallet and the merchant has a partnership with another merchant or collection of merchants, the multi-merchant wallet may be acceptable at multiple locations.

Thus, the mobile application may receive an entity identifier (e.g., a merchant identifier (MID)) from the merchant POS and may use the entity identifier to determine whether untrusted account credentials may be used for a transaction, the level of risk associated with the transaction, and any value added services (VAS) data that may be submitted with the transaction. Further, the merchant POS may receive a wallet identifier (WID) from the mobile application to determine whether the merchant POS should allow the transaction (e.g., whether the payment credentials originate from the merchant's mobile application or a mobile application that the merchant trusts) and/or if untrusted account data can be selected for a transaction.

Another embodiment of the EDI includes providing a uniform VAS applet identifier (VAS AID) for use during transactions. Issuers, merchants and third party vendors may offer VAS services based on the uniform VAS AID. The uniform VAS AID (VAID) may allow VAS application users to obtain greater interoperability and adoption across multiple merchants.

As such, the VAS application may keep track of a user's value added services account information (e.g., loyalty, coupon, etc.) for a variety of different merchants and allow for easy integration of the VAS data during transaction processing. For example, a user may use their "Merchant A" mobile application in a payment transaction at a "Merchant A" location and VAS data (e.g., a loyalty account number, a coupon, etc.) associated with their account may be provided during the transaction automatically without requiring the consumer to select or otherwise interact with their loyalty account or payment application.

The VAS application may select the relevant loyalty information based on an entity identifier (e.g., a merchant identifier (MID)) received from a POS during interaction between the mobile device and the merchant access device. For example, if a VAS application supports both "Merchant A" and "Merchant B" loyalty data, a consumer may use the VAS application at either merchant to purchase goods and the VAS application may select the appropriate loyalty account data based on the merchant identifier (MID) associated with the merchant POS (e.g., Merchant A loyalty account number is associated with "Merchant A" merchant identifier).

Before discussing specific embodiments and examples, some descriptions of terms used herein are provided below.

An "application" may include any software module configured to perform a specific function or functions when executed by a processor of a computer. For example, a "mobile application" may include a software module that is configured to be operated by a mobile device. Applications may be configured to perform many different functions. For instance, a "payment application" may include a software module that is configured to store and provide payment information for a transaction. A "wallet application" may include a software module with similar functionality to a payment application that has multiple account applets provisioned or enrolled with the application and usable through the application.

A payment application may store account credentials (e.g., account identifier, expiration date, card verification value (CVV), etc.) on a secure memory or trusted execution environment (e.g., secure element). The sensitive payment information may be accessed by requesting the payment information from the payment application using an applet identifier (AID) or other address information for accessing the correct payment application. Any number of communication protocols may be used to access the payment information from the payment application and use the received payment information in a payment transaction.

"Credentials" may include any information that identifies a particular entity, article, right, and/or item. For example, an account credential may identify and provide confirmation that a device, person, or entity has permission to access the account. Account credentials may include as little or as much data as necessary. For example, account credentials may include an account identifier, an expiration date, a generated cryptogram, a verification value, or any combination thereof.

"Payment information" may include any data that is associated with a payment. For example, payment information may include any data that may be used to identify an account and use the account in a payment transaction. For instance, payment information may include account credentials (e.g., primary account identifier (PAN), expiration date, card verification value (CVV), device authentication information (e.g., transaction cryptogram), dynamic authentication information (e.g., a dynamic cryptogram), etc.), personal information associated with a user or a consumer (e.g., name, billing address, residential address, date of birth, etc.), account information (e.g., issuer identifier (BIN), account issuance date, etc.), cardholder verification information (e.g., passcode, password, personal identification number (PIN), etc.), an indication of an authentication process for transaction processing (e.g., online PIN, signature, etc.), and/or any other suitable or relevant information for performing a transaction.

An "applet" includes any application that performs a small number of tasks that runs within the scope of a larger program. For example, a mobile application may comprise multiple account applets which are designed to store account credentials and allow the mobile application to use the account credentials in an transaction. In some embodiments, an applet may be associated with an applet identifier (AID) which identifies the location and/or identity of the applet. In some embodiments, an applet may be configured to provide any payment information associated with stored account credentials (e.g., generate and provide a dynamic cryptogram, transaction limits, etc.).

An "applet identifier" (AID) may include any information that may identify an applet. For example, an AID can include a data address for an applet stored on a mobile device or may be used by another program to reference the location of the applet. The AID can be in any suitable format. For example, an AID may include a set of alphanumeric characters. In some embodiments, an AID may identify a mobile application, a payment application, applets within an application and/or any combination thereof.

Further, in some embodiments, an AID can be associated with a set of features and/or services relating to how a transaction conducted using the corresponding payment application is processed. In some embodiments, the AID may be associated with account information provisioned into a mobile application and the AID may be passed between devices as a means for identifying a particular account applet and/or particular processing options for an account applet. For instance, in some embodiments, an AID may indicate to an access device which payment processing network (e.g., VisaNet™) should be used to process a transaction conducted with the payment applet corresponding to the AID; a type of account or financial credentials associated with the applet (e.g., debit, credit, loyalty, etc.); account-related information (e.g., platinum level account, gold level account, etc.); an account issuer (e.g., Bank A); and/or any other information about a mobile application, an applet, and/or underlying account data associated with the applet.

In some embodiments, the AID may have a standardized format to include information about an applet provider (e.g., payment network A, merchant B, etc.) and an application type (e.g., account or product type, account issuer, etc.) associated with each mobile application or account applet. For example, a first portion of an AID may identify an application provider associated with card data provisioned on a device and a second portion may identify an account type associated with the application provider. For instance, the AID (e.g., A000000031010) can have a first portion (e.g., A00000003) that identifies an application provider (e.g., payment network A) and a second portion (e.g., 1010) that identifies a type of account provisioned into the identified applet (e.g., debit or credit account). Further, in some embodiments, the second portion (or a third portion) could also identify an issuer associated with the provisioned account and/or applet (e.g., Issuer B). Thus, the AID may be used by the access device to determine if the access device can support processing a transaction initiated using the payment or account applet.

In some embodiments, the enhanced data interface (EDI) may reclassify applet identifiers (AIDs). For example, applet identifiers may be classified as trusted applet identifiers (TAID), untrusted applet identifiers (UAID), and value added services applet/application identifiers (VAID).

A "trusted applet identifier" (TAID) may include an identifier for an applet or application that includes trusted credentials that have a higher level of confidence than other applets. For example, a TAID may identify an account applet where the consumer or the consumer account was verified by the issuer during enrollment of the account. Further, the TAID may indicate that an issuer system was involved or participated in the account provision process. For example, a TAID may be similar to a traditional AID for a mobile payment application that is provisioned into a secure element or other trusted execution environment where multiple parties (including an issuer) are involved in the provisioning process before approval is provided for enrollment, delivery, or provisioning of the payment application. Thus, a TAID may indicate that the identified account applet or application was provisioned with credentials in which an issuer of the credentials participated during the provisioning of the account.

An "untrusted applet identifier" (UAID) may identify an applet or application that includes credentials that have a lower level of confidence than a trusted applet identifier. For example, a UAID may identify an account applet where account credentials have been enrolled by a merchant associated with the mobile application without issuer participation or verification of the consumer or the consumer account during provisioning of the account credentials. For example, some mobile applications may allow a consumer to add payment credentials of a consumer account without authenticating or contacting an issuer associated with the account of the consumer during enrollment, provisioning, or delivery of the applet. Note that an applet may be trusted by the mobile device and the name, "untrusted applet" does not indicate that the applet is untrusted by the device. Instead, the untrusted applet identifier may identify an applet that is still trusted by the mobile device and/or mobile application but that includes information that cannot be confirmed as being trusted because an issuer was not involved in the enrollment or provisioning process of credentials stored by the account applet identified by the UAID.

A "value added services application" may include a mobile application which is directed to storing and providing value added services (VAS) information. The VAS application may include VAS information for many different merchants. For example, the VAS application may include information associated with multiple loyalty identifiers (LIDs) where each loyalty identifier (LID) is associated with a separate merchant or service provider. Further, each loyalty identifier may have multiple loyalty content data which can be associated with multiple offers, values, or any other information that may be passed and used during a contactless transaction. In some embodiments, the value added services application may be referred to as a "multiple entity applet identifier" because the VAS application stored VAS data for a number of different entities (e.g., merchants). For example, the VAS application may use an entity identifier (e.g., a merchant identifier (MID)) to determine relevant VAS information to an entity (e.g., merchant) associated with an access device and may provide the relevant information in response to receiving the entity identifier. VAS application logic may be part of a mobile application which supports payment or it could be a separate executable application.

A "highest priority applet identifier" may include an applet identifier (AID) that has been determined to have the highest priority. For example, the highest priority AID may be determined by a mobile device or an access device. Thus, in some embodiments, the highest priority AID may include only those AIDs that are supported by an access device. The priority of each AID may be determined through any suitable method. For instance, priority of AIDs may be based on consumer input (e.g., a consumer chooses their top three supported payment applications), closest match with configuration options for a device (e.g., applications associated with a preferred type of processing by the device are given priority), transaction security (e.g., applications that require a high level of authentication in order to process a transaction are given higher priority than other applications, payment networks with a better security track-record are provided priority), transaction processing speed (e.g., applications associated with a particular payment network that is faster than other payment networks are given higher priority), and/or any other information or processes may be used to prioritize AIDs associated with applications on the mobile device.

An "entity identifier" may include any data that identifies an owner, operator, provider, or responsible party associated with a device. For example, for a POS terminal, an entity identifier may include a merchant identifier (MID) for the merchant that controls and/or operates the POS. A MID may include any relevant information for identifying a merchant. For example, the MID may include an alphanumeric string or other data value that is associated with a particular merchant. The entity identifier (e.g., MID) may be capable of being shared with other devices. Other devices may store a directory of trusted entities (e.g., trusted merchants) which include a list of trusted entity identifiers which the devices may compares to ensure a merchant access device is trusted.

A "wallet identifier (WID)" may include any data that identifies a mobile application provider, mobile wallet provider, or application provider. The WID may include any amount of information and may be passed between devices. For example, the WID may include an alphanumeric string or other data value that is associated with a particular mobile wallet provider or mobile application provider. A device may include a directory of trusted or supported application providers which may be compared to the WID to ensure a mobile application provider is trusted by a processing entity.

A "loyalty identifier" (LID) may include any data that identifies loyalty information. For example, a LID may include an alphanumeric string of characters that identifies a particular consumer account (e.g., a loyalty card number or email address). A LID may include any other suitable information that is capable of identifying consumer loyalty information. The LID may be stored in a mobile application and may be accessed when an entity identifier (e.g., merchant identifier) is validated as matching the relevant data location for the LID. Further, each merchant or entity may have one or more LIDs stored within a mobile application.

A "Loyalty Container Data" (LCD) may include any data that identifies a particular loyalty offer, coupon, or value added benefit. For example, a LCD may include an alphanumeric string of characters that identifies a benefit associated with a merchant (e.g., a coupon number). The LCD may be stored in a mobile application and may be accessed when an entity identifier (e.g., merchant identifier) is validated as matching the relevant data location for the LCD. Further, each merchant or entity may have one or more LCDs stored within a mobile application.

A "module" may include any component or sub-component of a system. For example, a module may include a software program configured to perform a particular function when executed by a processor.

A. Exemplary Enhanced Data Interface (EDI) Communication System

FIG. 1 shows an exemplary enhanced data interface (EDI) system including a mobile device 110, an access device 120, and a mobile application computer 170. The mobile device 110 and the access device 120 are configured to communicate using an EDI communication protocol that allows the mobile device 110 and the access device 120 to validate the identity, access rights, and compatibility between a mobile application 112 of the mobile device 110 and the merchant access device 120. The mobile application computer 170 is configured to communicate with the mobile application 112 of the mobile device 110 to provision credentials.

A mobile device 110, also referred to as a "portable electronic device," may be, for example, a cellular or wireless telephone (e.g., a smartphone), personal digital assistant (PDA), portable computer (e.g., tablet or laptop computer), pager, wearable device (e.g., smartwatch, glasses, etc.) or other portable device carried by an accountholder. A mobile device 110 and a portable consumer device (not shown) are described further below with reference to FIGS. 5 and 6, respectively.

An access device 120 may include any device that is configured to interface with a mobile device 110 and/or portable consumer device (not shown) to initiate a transaction. Examples of access devices 120 include point of sale (POS) devices, cellular phones, PDAs, personal computers, tablets, handheld specialized readers, set-top boxes, electronic cash registers, automated teller machines (ATMs), virtual cash registers, kiosks, security systems, access systems, and the like. Access devices 120 may use means such as radio frequency (RF) readers to interact with the mobile device 110 through contactless communication (i.e., a contactless reader).

The access device 120 may include an application selection module 121 that is configured to interact with the mobile operating system 116 of the mobile device 110 in order identify a supported mobile application present on the mobile device 110. The application selection module is configured to generate any relevant communications relevant to determining available applications on a mobile device 110, selecting a supported mobile application, providing any information requested by the mobile device 110, and processing a transaction using credentials associated with the selected mobile application 112.

The components in the mobile device 110 may include device hardware 118, a mobile operating system (OS) 116, and an applications environment 111 in which a mobile application 112 and a value added services (VAS) application may reside. Device hardware 118 may include a contactless interface 119 that can interact with a contactless reader 123 of an access device 120. Examples of contactless interface 119 may include one or more radio frequency (RF) transceivers that can send and receive communications using near-field communications (NFC), or other radio frequency or wireless communication protocols such as Bluetooth, Bluetooth low-energy (BLE), Wi-Fi, iBeacon, etc.

The applications environment 111 of the mobile device 110 may host a mobile application 112 and a value added services (VAS) application 114. The mobile application 112 may be provided, installed, and maintained by a mobile application computer 170. The VAS application may be provided by the mobile application computer 170 or by a VAS service provider computer (not shown). The mobile application computer 170 may be owned or operated by a mobile application developer including a merchant or other service provider. The mobile application 112 may be a merchant's own mobile application from which consumers can conduct e-commerce or point-of-sale (POS) transactions with that merchant, or may be a mobile wallet application that supports multiple merchants.

The value added services (VAS) application 114 may include an application that is configured to manage VAS data for the consumer across multiple different merchants, entities, and/or service providers. The VAS application 114 may store loyalty data that is organized by an entity identifier (e.g., a merchant identifier). The merchant identifier may include, for example, a loyalty identifier that is uniform across multiple mobile devices such that the VAS application 114 knows the appropriate location of VAS data stored through the VAS application 114 for a particular merchant. In some embodiments, the VAS application 114 can be the part of the payment application 112 or it could be a separate application (as shown). The VAS application 114 may be identified and selected using a VAS applet identifier (VAID) which informs the mobile operating system to send a communication (i.e., a APDU) to the VAS application 114.

According to some embodiments, the mobile application 112 may include applets with provisioned credentials 113. The applets 113 may be configured to perform the payment functionality described herein. For example, the applets 113 may obtain the provisioned credentials stored on the mobile device 110, generate transaction cryptograms, and deliver any other payment information to the mobile operating system 116 for transmission over the contactless interface 119 to the contactless reader 123 of the access device 120. Each of the applets 113 may include provisioned account data that is associated with one or more accounts. As will be described in further detail below, each of the applets 113 may be identified by one or more account applet identifiers (AIDs), including trusted applet identifiers (TAIDs) and untrusted applet identifiers (UAIDs) based on the status of the account credentials stored therein (i.e., depending on whether the account was validated by an issuer before the account credentials were provisioned). For example, an applet 113 may include a software module or set of application programming interfaces (APIs) provided by a payment network (e.g., VisaNet™) configured to process account credentials associated with an account provisioned through the mobile application 112. Thus, each account provisioned into the mobile application 112 may have an applet 113 associated therewith or a single applet 113 may be configured to choose between a number of different account credentials associated with the same account applet 113.

The mobile application 112 may also manage interactions with the mobile application computer 170 including account provisioning and/or account enrollment communications, lifecycle management processes, and any other maintenance processes. Mobile application 112 may perform a set of functions to enroll or provision an account with the mobile application computer 170.

The mobile application computer 170 may include any application developer or owner of the mobile application 112 and/or the VAS application 114. The mobile application computer 170 may include a credential provisioning module 171 which may be configured to provision account credentials to the mobile device 110 through the mobile application 112. Note that in some embodiments, the payment application 112 and VAS application 114 may be provisioned by any entities within a mobile communication ecosystem (e.g., mobile network operator, device manufacturer, payment processing network 150, etc.). The credential provisioning module 171 may include any software and hardware modules that allow the mobile application computer 170 to facilitate the provisioning of account information on a mobile device 110. Further, in some embodiments, the provisioning of credentials may be completed by a provisioning service or other third party (not shown).

In secure element based implementations, a contactless application (e.g., a mobile wallet or payment application for contactless transactions) using a contactless interface 119 to communicate with a contactless reader 123 of an access device 120 would have to be coded for and be executed on a trusted execution environment (e.g., a secure element) in order to gain access to the contactless interface 119. In some embodiments, mobile device 110 may include a mobile operating system (OS) 116 that implements a set of card emulation application programming interfaces (APIs) 117 such as host card emulation (HCE) APIs to allow the mobile application 112 to gain access to the contactless interface 119 without requiring the use of a secure element (not shown). For example, the card emulation APIs 117 may be coded for and be executed from mobile OS 116 of the mobile device 110, and may include programming function calls to allow the mobile application 112 to receive, process, and respond to transaction communications such as Application Protocol Data Unit (APDU) commands sent from the contactless reader 123 of the access device 120. In this manner, the mobile device 110 is able to conduct contactless transactions without requiring access to a secure element (not shown) on the mobile device 110.

Once the mobile device 110 and the mobile application 112 have been provisioned with the account credentials 113, the mobile device 110 can conduct transactions by interacting with contactless reader 123 of the access device 120 (e.g., at a merchant point-of-sale (POS) location). The contactless reader 123 may include one or more radio frequency (RF) transceivers that can send and receive communications using near-field communication (NFC) or other radio frequency or wireless communication protocols such as Bluetooth, BLE, Wi-Fi, iBeacon, etc.

To conduct a transaction, a user of the mobile device 110 may place the mobile device 110 in proximity to the contactless reader 123 of the access device 120 for scanning by the contactless reader 123 of the access device 120. The mobile device 110 may provide the access device 120 with account credentials (e.g., an account identifier such as a primary account number (PAN), an alternate account identifier such as an alternate PAN, or a token, etc.) to identify the account of the user and additional information such as a wallet identifier (WID) associated with the mobile application computer 170 or other mobile application developer. For example, in some embodiments, credentials (e.g., an account identifier or token) and additional information (e.g., a transaction cryptogram, account parameters, etc.) can be transmitted to access device 120 in APDU responses that are responsive to a series of APDU commands received from the access device 120. The access device 120 or a merchant computer (not shown) coupled to the access device 120 may then generate an authorization request message including the account identifier or token, and additional information such as a transaction cryptogram and other transaction data, and forward the authorization request message to a payment network for transaction processing. Further details regarding transaction processing are described below in reference to FIG. 4.

As explained above and as may be described in further detail below, the access device 120 may communicate with the mobile device 110 to obtain payment information. However, certain access devices may only be configured to receive and process particular types of information associated with particular payment applications. For example, if the access device 120 is only configured to process transactions using a certain payment processing network 150 (e.g., VisaNet™), the access device 120 may not process transaction information originating from payment applications that are configured to provide information in a processing format of a different payment processing network 150 (e.g., MasterCard™). Accordingly, access devices 120 and mobile devices 110 may perform a mobile application selection process before a transaction may be initiated. Further information regarding these processes are provided below in reference to FIGS. 2-4.

Figure 2:
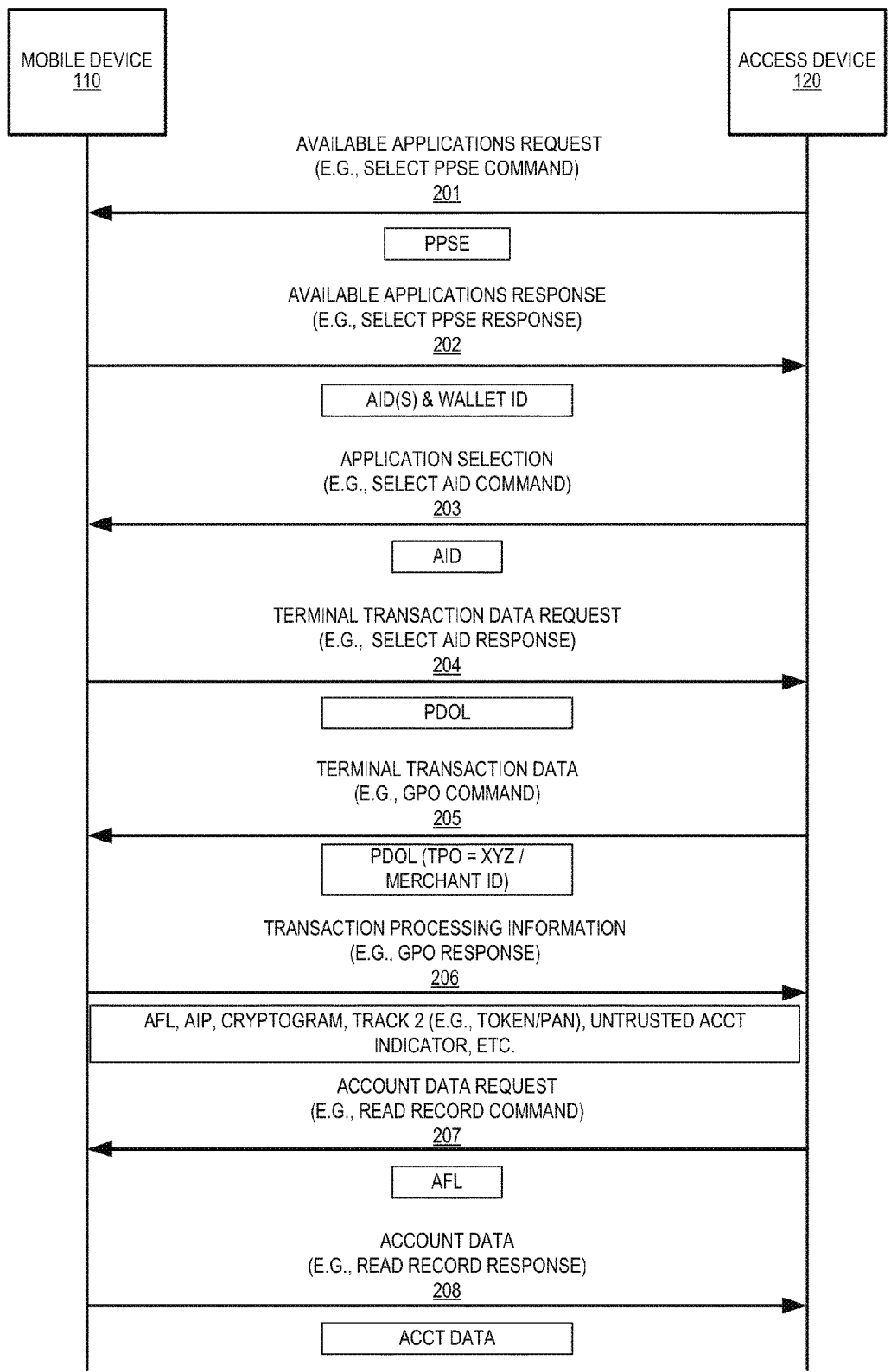
FIG. 2 illustrates an exemplary short-range communication protocol for a transaction between a mobile device and an access device, according to one embodiment of the present invention.

FIG. 2 shows an exemplary flow diagram of a method of performing a short-range communication between a mobile device 110 and an access device 120 during a payment transaction, according to one embodiment of the invention. Note that FIG. 2 shows one exemplary implementation of the concepts described herein and embodiments are not limited to such communication protocols, methods, and steps. Accordingly, although FIG. 2 shows one implementation of a enhanced data interface protocol for communicating payment information between an access device 120 and a mobile device 110, many other protocols and communication techniques could be implemented.

The contactless reader 123 of the access device 120 may be configured to identify the presence of a mobile device 110 within communication range. For example, the contactless interface 119 of the mobile device 110 may ping or otherwise attempt to find suitable devices to communicate with periodically. When the access device 120 detects the presence of mobile device 110 in proximity to the contactless reader 123 of the access device 120, the application selection module 121 of the access device 120 may initiate a transaction by sending a request for available account applets to the mobile device 110. The request for available applets is sent in order to obtain information regarding which mobile applications and corresponding account applets (e.g., a list of account applet identifiers) may be available on the mobile device 110. In some embodiments, the request for available applets 201 may be in the form of a "select proximity payment system environment (PPSE)" command. In such embodiments, the request for available applets 201 may include a payment environment identifier (e.g., a PPSE name such as "2PAY.SYS.DDF01") to identify the payment environment supported by the access device 120.

Upon receiving the available applications request 201, the mobile device 110 may identify and process the request by recognizing the payment environment identifier (e.g., PPSE name) included in the request, and respond by sending an available applications response 202 back to access device 120. The available applications response 202 may include a list of available account applet identifiers (AIDs), a wallet identifier associated with the mobile application 112, application configuration options associated with the available AIDs, and may include the proximity payment environment identifier (e.g., PPSE name) as the dedicated file name.

In some embodiments, the available applications response 202 may be in the form of a "select PPSE" response and may include PPSE file control information (FCI). For example, the available applications response 202 may include a directory entry for each available AID on the mobile device 110 with a wallet identifier associated with each available AID. Each directory entry may include information such as the AID, an application label associated with the AID (e.g., a mnemonic associated with the AID), a wallet identifier (WID) associated with the mobile application, an application priority indicator indicating the priority of the AID, a kernel identifier indicating the application's kernel preference, and/or additional information relating to the particular AID. The available applications response 202 may also include other data such as FCI issuer discretionary data or any other relevant information.

The access device 120 may determine a supported account applet based on the received available applet identifiers and may send an "application selection" command 203 including the selected AID to the mobile device 110.

Additionally, in some embodiments, upon receiving the application selection message 203, the mobile device 110 may send a terminal transaction data request 204 to request transaction data from access device 120 which may be needed to execute the transaction using the selected application associated with the selected AID. In some embodiments, the terminal transaction data request 204 may be in the form of a "Select AID Response" and may include applet identifier (AID) file control information (FCI) with the selected AID as the dedicated file name. The terminal transaction data request may include a list of transaction data identifiers to request the appropriate data from the access device 120, and the list of transaction data identifiers can be in the form of a processing options data object list (PDOL).

The transaction data requested by the mobile application 113 for the transaction may include an entity identifier associated with the access device 120 (e.g., a merchant identifier (MID)), terminal processing options (TPO), authorized amount, other amount, terminal country code, terminal verification results, transaction currency code, transaction data, transaction type, and/or an unpredictable number. The terminal transaction data request may also include other data such as FCI issuer discretionary data, application program identifier, and language preference. In other embodiments, the transaction information may be provided as part of the application selection message 203 and/or as part of the available applications request message 201.

After receiving the terminal transaction data request 204, the access device 120 may send, to the mobile application 112 of mobile device 110, the terminal transaction data 205 requested by the mobile application 113. In some embodiments, the terminal transaction data 205 may be sent in the form of a get processing options (GPO) command, and may include the requested terminal transaction data 205 in a processing options data object list (PDOL). In some embodiments, the terminal transaction data 205 (e.g., Transaction Processing Options (TPO)) may include a TPO indicator that indicates which transaction data types the access device 120 supports.

Because the mobile application adds account data without validating the account with an account issuer, different security levels of transactions (e.g., card present (CP) transaction, card-not present (CNP) transaction, advanced authentication (e.g., 3DS Verification) transaction, etc.) may be provided based on the mobile application owner/developer, the merchant, and the status of the selected account applet provisioned on the mobile device 110. For example, depending on the type of credentials selected, different security levels for the transaction may exist. So, if a validated or trusted account applet is selected, the mobile application may initiate a card present (CP) transaction. However, if non-validated or untrusted accounts are being used, the mobile application may initiate a card-not-present (CNP) transaction. Further, where supported by a merchant POS, the mobile application may initiate a transaction using an enhanced authentication (e.g., 3D-Secure) transaction payload. Accordingly, the TPO (also referred to as access device configuration options) allow the mobile device 110 to determine whether the access device 120 is configured to process the type of transaction that is associated with the selected account applet.

Once the selected applet 113 of the mobile device 110 receives the terminal transaction data 205, the mobile device 110 obtains the relevant account credentials from the selected applet as well as any other relevant payment information and may send a set of transaction processing information 206 including the account credentials and any other relevant transaction processing information to the access device 120. In some embodiments, the transaction processing information 206 can be sent in the form of a "get processing options" (GPO) response. In some embodiments, the transaction processing information may include one or more application file locators (AFLs) that can be used as file addresses by access device 120 to read account data stored on the mobile device 110, and an application interchange profile (AIP) that can be used to indicate the capabilities of the payment application.

For example, the transaction processing information may include any credentials for the transaction including a transaction cryptogram generated using transaction information, Track-2 equivalent data, and additional data. For example, the transaction processing information may include an untrusted applet indicator where the transaction is originated using an untrusted account applet. Further, the transaction processing information may include issuer application data (IAD), a form factor indicator (FFI), card transaction qualifiers (CTQ), cryptogram information data (CID), an application transaction counter (ATC), and/or an application PAN sequence number (PSN). In some embodiments, the issuer application data (IAD) may include a length indicator indicating the length of the IAD, cryptogram version number (CVN) indicating the version of the transaction cryptogram, a derived key indicator (DKI) that can be used to identify a master key (e.g. a master key associated with the issuer), and/or card verification results (CVR).

It should be understood that in some embodiments, the transaction processing information 206 being sent from mobile device 110 to access device 120 may include some or all of the information describe above, and in some embodiments, may include additional information not specifically described.

After the access device 120 receives the transaction processing information 206, the access device 120 may send an account data request 207 to the mobile device 110 to read additional account data 208 that may be stored on the mobile device 110. In some embodiments, the account data request 207 may be in the form of a "read record" command, and may include an application file locator (AFL) indicating the location of the account data that access device 120 is attempting to read. The AFL included in the account data request 207 may correspond to an AFL in the transaction processing information 206 that was provided to access device 120 from mobile device 110.

In response to receiving the account data request 207 from the access device 120, the mobile device 110 may send the account data 208 stored at the location indicated by the AFL to access device 120. In some embodiments, the account data 208 may be sent in the form of a "read record" response. The account data 208 may include, for example, application usage control that indicates the issuer's restrictions on the usage and services allowed for the application, the cardholder's name, customer exclusive data, issuer country code, and/or other account related data that is accessible at the AFL location and is stored in the mobile device 110.

It should be understood that in some embodiments, the account data 208 being sent from mobile device 110 to access device 120 may include some or all of the information describe above, and in some embodiments, may include additional information not specifically described. Further, any and all of this information may be provided in response to receiving a selection message and/or obtaining payment credentials as will be described in further detail below.

B. Exemplary Methods Incorporating an Enhanced Data Interface

FIGS. 3A-3E illustrate an exemplary flow diagram of an interaction between a mobile device 110 including a VAS application 114 and a mobile application 112 with account applets 113, and a merchant access device 120 using an enhanced data interface for a contactless transaction.

1. Card Enrollment and Transaction Initiation

Figure 3A:
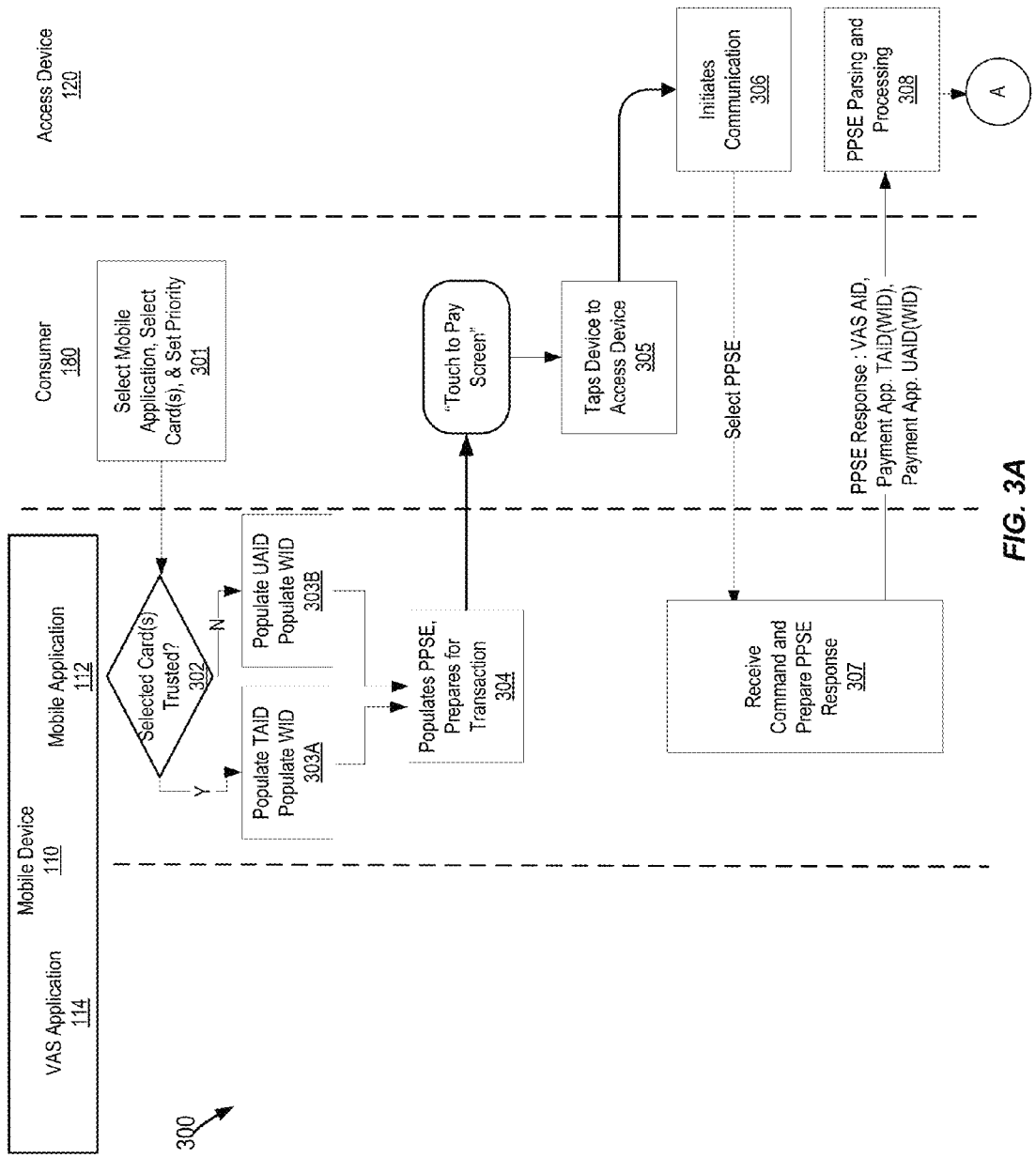
FIG. 3A illustrates a portion of an interaction flow diagram including pre-transaction processing and transaction initiation steps, according to one embodiment of the present invention.
Figure 3B:
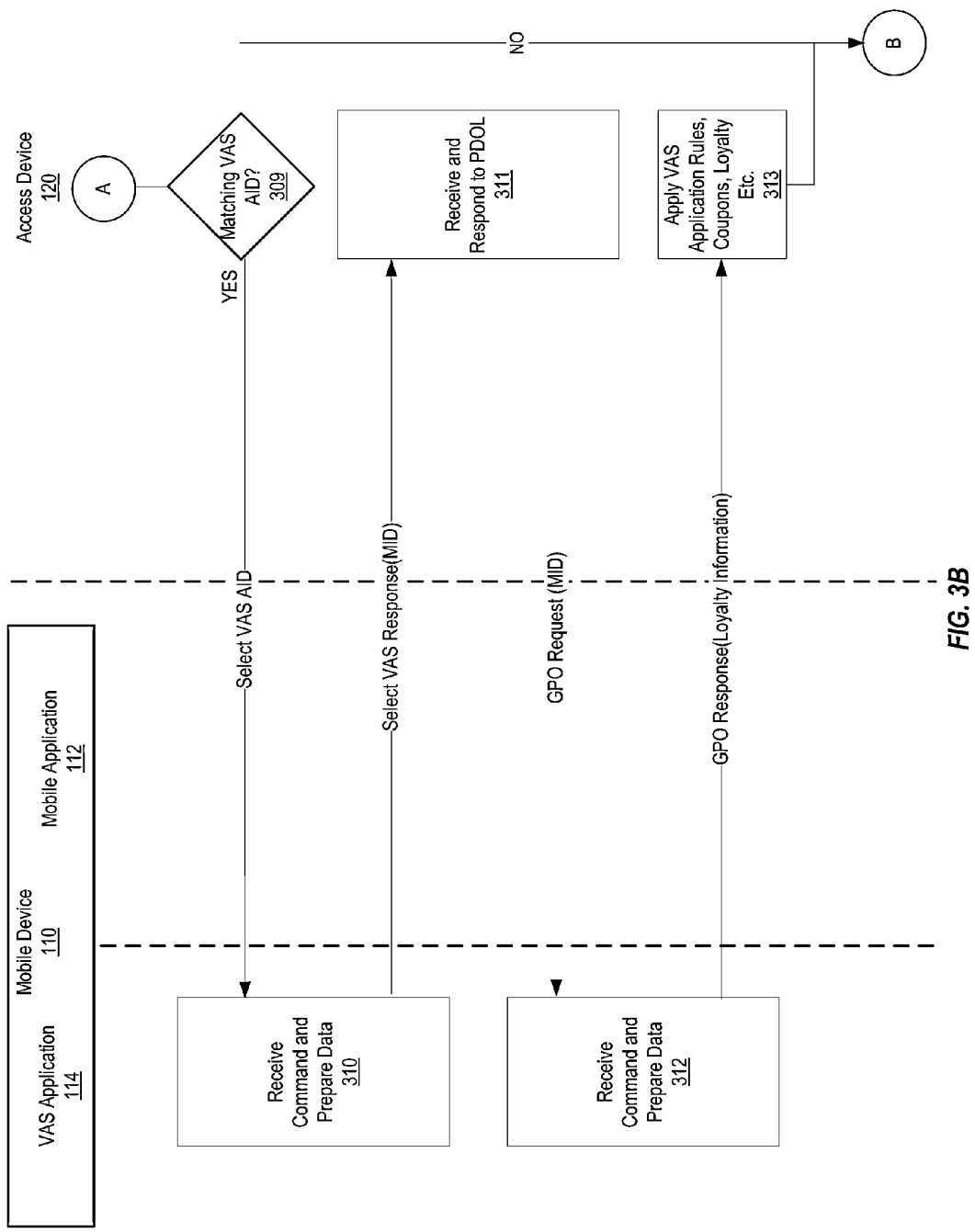
FIG. 3B illustrates a portion of an interaction flow diagram including pre-transaction value added services application processing steps, according to one embodiment of the present invention.
Figure 3C:
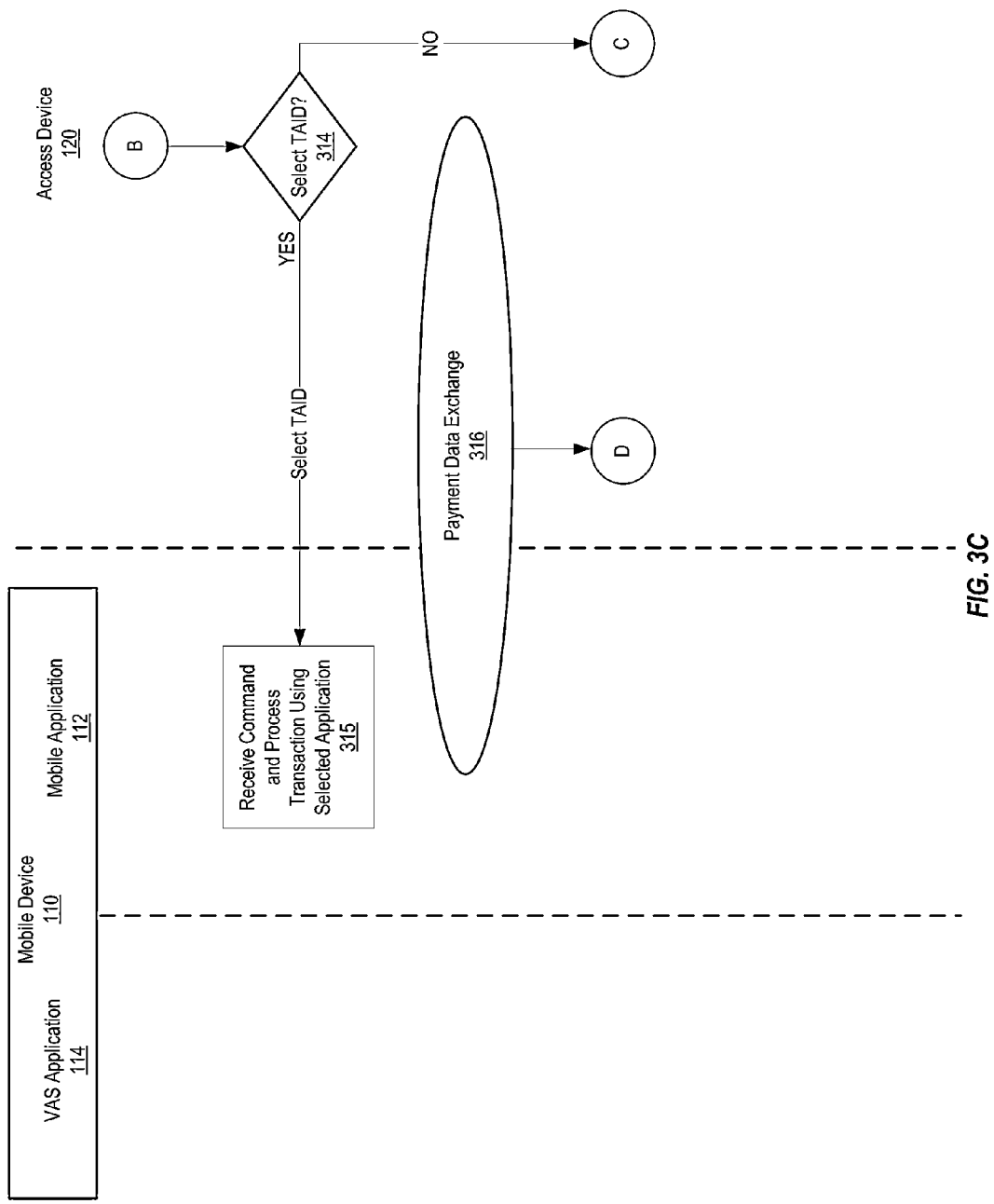
FIG. 3C illustrates a portion of an interaction flow diagram including trusted applet identifier selection and processing steps, according to one embodiment of the present invention.
Figure 3D:
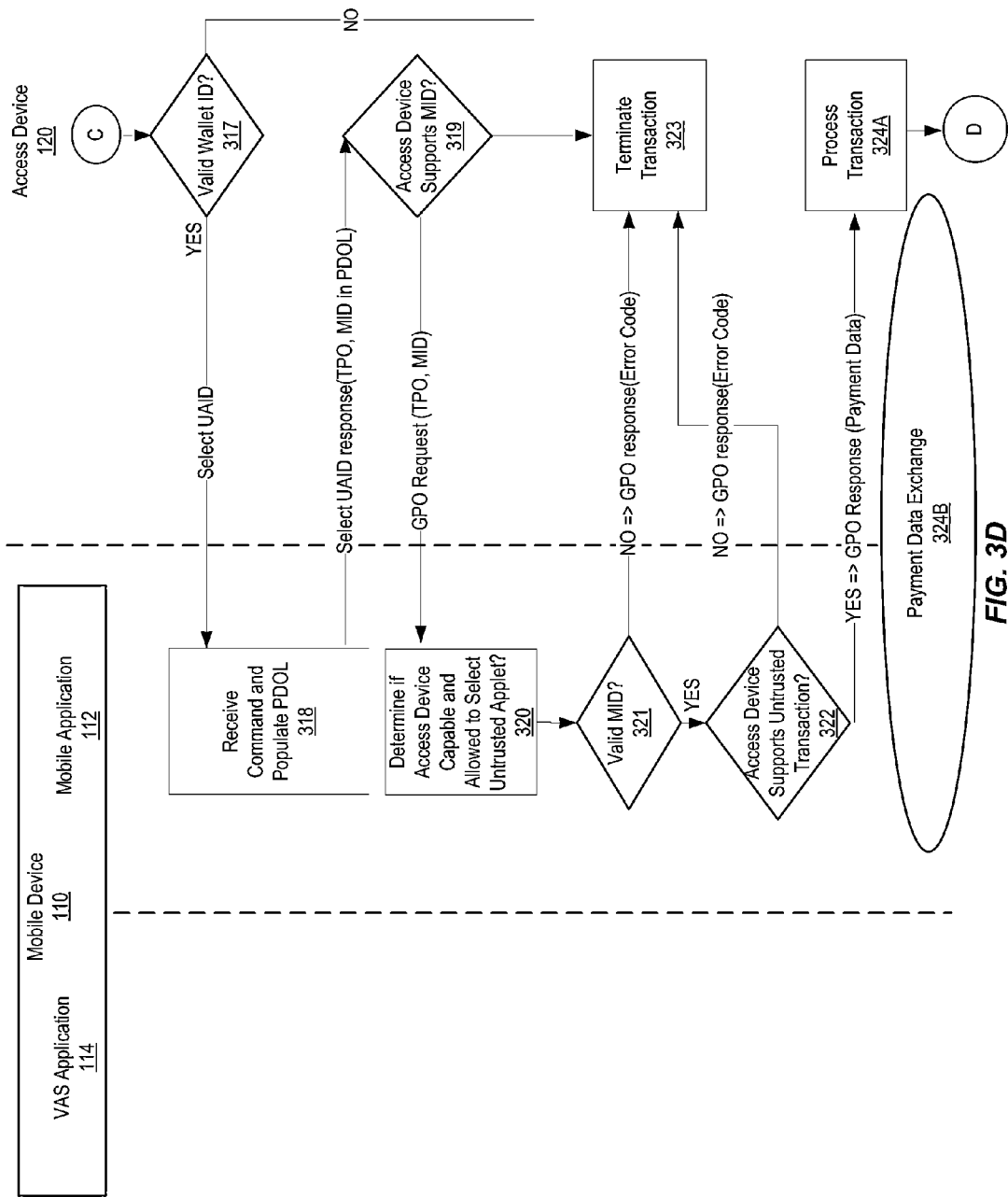
FIG. 3D illustrates a portion of an interaction flow diagram including untrusted applet identifier selection and processing steps, according to one embodiment of the present invention.
Figure 3E:
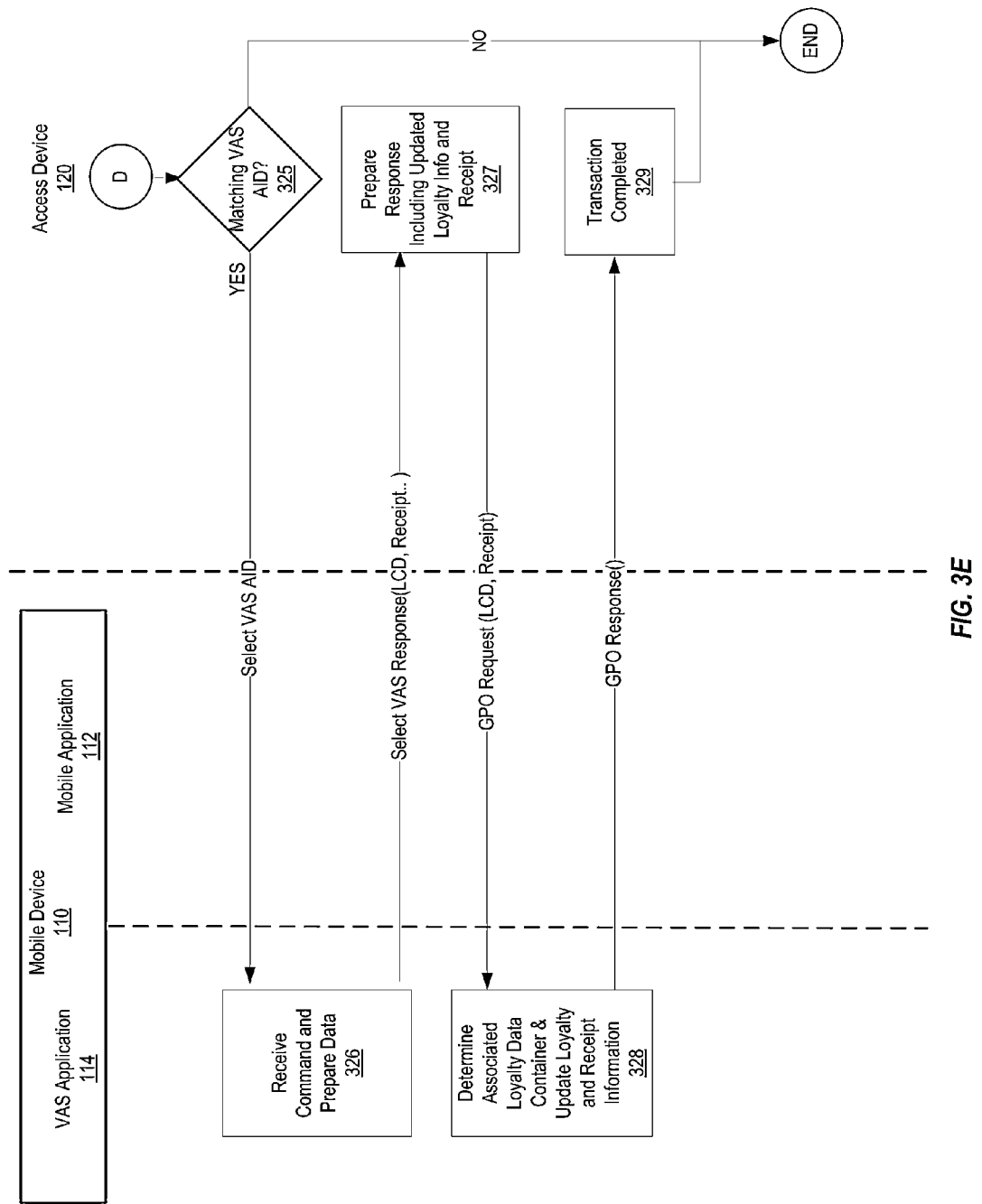
FIG. 3E illustrates a portion of an interaction flow diagram including post-transaction value added services application updating steps, according to one embodiment of the present invention.

First, steps 301-304 occur at some point before a transaction and may occur before a consumer arrives at a merchant location. The consumer may provision card accounts using the mobile application before the process shown in FIG. 3A is performed. Once card account credentials are provisioned onto the mobile device 110 through the mobile application 112, the process shown in FIG. 3A may begin.

At step 301, a consumer selects a card or a priority of multiple cards to use for a transaction through a mobile application. Additionally, the consumer may set priority for each card that is enrolled in a mobile application 112 such that the mobile device 110 (or the merchant access device 120) may select a preferred card where multiple options are supported by a merchant access device 120 during a transaction. Alternatively or additionally, a consumer may be prompted before or during a transaction for their preferences for a transaction. For example, the user may open a mobile application on their device before they initiate a transaction and the available cards may be provided to the user for selection. Alternatively or additionally, preconfigured preferences of the user may be used to select the preferred card or account. Further, in some embodiments, the mobile application may be automatically selected by the access device 120 from a variety of mobile applications on the mobile device 110 during the application selection process (e.g., steps 201-203 of FIG. 2).

At step 302, the mobile application 112 determines whether each of the selected cards or accounts (and their corresponding account credentials) correspond to trusted account applets or untrusted account applets. An account applet may have different applet identifiers based on whether the account applet is considered "trusted" or "untrusted." As explained above, an untrusted account applet may be identified using an untrusted account applet identifier (UAID) that indicates that the associated account applet was provisioned into the device without being authenticated, approved, or validated by an issuer associated with the account. In contrast, a trusted account applet is identified using a trusted applet identifier (TAID) which indicates that the associated account applet was provisioned with account credentials only after an issuer associated with the account participated (i.e., approved, validated, and/or agreed) in the provisioning of the account credentials with the mobile application.

The mobile application 112 may determine whether the account applet associated with a selected card or account is trusted or untrusted through any suitable method. For example, the mobile application may determine a status for each of the account applets selected by the consumer as being a trusted applet or an untrusted applet based on a provisioning process associated with each of the one or more applets. For instance, the mobile application may include a flag or other indicator along with the stored account credentials or account applet associated with each account to indicate whether the account credentials associated with the applet was validated by an associated account issuer during provisioning. Alternatively or additionally, the mobile application may compare an issuer associated with the account credentials to a list of known integrated issuers for the mobile application and may assign the account applet a trusted account applet status or an untrusted account applet status based on the identity of the account issuer.

Alternatively or additionally, the mobile application may determine the status of an account applet based on the identity of the mobile application generally. For example, if the mobile application is configured to validate all accounts and/or no account provisioning requests with issuers, than the status of the account applets may be uniform across all account applets added through the mobile application. Thus, the status of any provisioned account applet through such a mobile application would be determined based on the settings and/or identity of the mobile application that provisioned the account applet.

At steps 303A-303B, the mobile application categorizes the applet identifiers associated with the selected accounts. Once the status of each of the selected account applets has been determined, the mobile application categorizes an applet identifier for each of the account applets selected by the consumer as being a trusted applet identifier or untrusted applet identifier based on the status of each of the account applets. The mobile application may categorize or determine the applet as having a TAID or UAID through any suitable method.

For example, the mobile application may provision a trusted applet identifier to every provisioned account applet provisioned to the mobile application and the mobile application may then map the applet identifier of the account applet to a predetermined untrusted applet identifier associated with the original applet identifier when the mobile application determines the applet status is untrusted. In such an embodiment, the trusted applet identifier would be the traditional applet identifier associated with traditional applets and applications provisioned for account data. Thus, a new account applet identifier may only be assigned to an account applet when the account applet is determined to be untrusted for an account. For instance, the mobile application may apply a TAID to UAID mapping table to determine the relationships between a trusted and untrusted applet identifier and assign an untrusted applet identifier to an account applet.

Alternatively or additionally, in some embodiments, the mobile application may have provisioned the account applet with a UAID or TAID during provisioning based on the participation of the issuer system. Thus, the mobile application may categorize the account applets as having a UAID or a TAID by identifying a type of applet identifier (e.g., UAID, TAID) associated with the account applet. For example, the UAID and the TAID may have different data indicators or flags to indicate whether an application is trusted or untrusted. For instance, a UAID may have an extra bit or may have a flag bit while a TAID may not have such characteristics, or vice versa. Further, any other method of identifying the character of the applet identifier may be implemented.

At step 303A, if the mobile application determines that a trusted card is selected, the mobile application 112 selects and populates a trusted applet identifier (TAID) in a list of available applets along with the wallet identifier (WID) associated with the mobile application 112. If multiple cards are selected (not shown), the steps may be repeated.

At step 303B, if the mobile application determines that an untrusted card is selected, the mobile application 112 selects and populates an untrusted applet identifier (UAID) along with the wallet identifier (WID) associated with the mobile application 112.

In embodiments where there are multiple account applets and account credentials associated with the mobile application, the process shown in steps 302-303 may be repeated for each of the account applets with the trusted and untrusted account applet identifiers being loaded into a list of available applet identifiers for a potential transaction.

At step 304, the mobile application 112 populates a proximity payment system environment (PPSE) with the list of TAID and/or UAID of the account applets associated with the mobile application along with the wallet identifier (WID) associated with the mobile application in preparation for communication with a contactless reader.

At step 305, the mobile device 110 informs the consumer that the mobile device 110 is ready for a transaction to be initiated and that the user should tap the mobile device 110 to the merchant's access device 120. The consumer taps the device 110 on the merchant access device 120 to initiate a contactless communication session with the merchant access device 120.

At step 306, the merchant access device 120 identifies that a contactless device is within communication proximity and the merchant access device 120 requests applet identifier (AID) identification information from the mobile application. For example, as described above in reference to step 201 of FIG. 2, the merchant POS may send a "Select PPSE Request" command to the mobile device 110. The "select PPSE request" command informs the mobile device 110 that the reader is within communication range and that the reader is requesting a list of the applet identifiers in the PPSE that are available for use in performing a transaction. In the present example, the merchant access device (e.g., POS) may initiate the communication. However, in some embodiments, the mobile application may recognize the presence of the access device 120 and send the PPSE command first with all the data that is loaded into the PPSE.

At step 307, the mobile application 112 receives the applet identifier identification request and prepares the list of applet identifiers (AID) for sending a response. The list of available applet identifiers may already be prepared in response to the consumer provisioning cards and/or selecting the application for the transaction (as described in step 304 above). Thus, the mobile application 112 may identify the applet identifiers (AIDs) that have been enrolled for the mobile application 112 as well as identifying the wallet identifier (WID) associated with the mobile application 112 and generate a list of available applet identifiers including both the UAIDs and TAIDs associated with the mobile application (or other mobile applications on the device). The mobile application 112 then sends an applet response informing the contactless reader of what applications are available for the transaction. For example, the mobile application may send a "Select PPSE Response" that includes a VAID, TAIDs associated with account applets that are enrolled with the mobile application 112, and UAIDs associated with account applets that are enrolled with the mobile application 112, along with specified additional parameters (e.g., WIDs associated with the AIDs). Additional details may be found in reference to step 202 of FIG. 2 described above.

At step 308, the access device 120 parses and processes the applet identifier response to identify if the reader is configured to process any of the AIDs received in the AID response. If the reader is configured to process a VAID identified in the PPSE response, a pre-payment VAS processing may be completed. If none of the VAIDs are supported by the merchant access device 120, the system may skip the steps in FIG. 3B and move to FIG. 3C.

The application selection module of the access device 120 may determine supported applet identifiers from the list of available applets by comparing each of the applet identifiers in the list of available applets to a list of supported applet identifiers stored in the access device 120. The list of supported account applets may be stored in a directory of TAIDs and UAIDs that the access device 120 is configured to support. Further, the list may be separated by TAIDs and UAIDs.

If there is a match, the application selection module may store each of the matching applet identifiers as one of the supported AIDs in order of priority indicated by the mobile device 110 in the list of available account applets. Thus, the access device 120 may have a list of supported account applets ranked in order of priority after analyzing the list of available account applets. In some embodiments, the access device 120 may select the highest priority applet from the list of supported applet identifiers as soon as a first match is made. However, in other embodiments, all of the available account applets may be determined before selecting an account applet.

2. Pre-Payment VAS Processing

At step 309, the application selection module of the access device 120 determines whether the VAS applet identifier is supported by the access device 120. If the merchant's reader supports a VAS application AID parsed from the applet identifier response (e.g., "Select PPSE Response"), the reader sends a selection command to the VAS application that the reader has selected the VAS application. For example, the merchant access device 120 may send a "Select VAS VAID" command that informs the mobile device 110 that the merchant access device 120 is selecting the VAS application for communication. Additional details may be found in reference to step 203 of FIG. 2 described above.

At step 310, the VAS mobile application receives the selection request and prepares a response to the selection request. For example, the VAS application may send a "Select VAS AID Response" that may include a request to receive the merchant identifier (MID) associated with the merchant access device 120 to make sure that merchant requesting the data is supported by the VAS application. The "VAS AID Response" may further include a VAS Status as well as additional parameters. Additional details may be found in reference to step 204 of FIG. 2 described above.

The "VAS Status" information indicates whether the VAS application is ready to send or receive VAS data. For example, the VAS status could be a bit that is a 1 or a 0, where when the VAS status is 1, the VAS application indicates to the reader that the VAS application is ready to send VAS data to an access device 120. After the VAS data has been delivered to the reader, and the VAS data has been processed, the VAS status may change to 0, which means that the VAS application is ready to accept information from the reader in the next interaction (e.g., post-payment VAS processing).

At step 311, the merchant access device 120 receives the select VAS response in the PDOL including the request for the merchant identifier (MID) and responds to the PDOL by returning the MID requested by the VAS application. For example, the merchant access device 120 may send a "Get Processing Options (GPO) Request" that includes the MID associated with the merchant access device 120. Additional details may be found in reference to step 205 of FIG. 2 described above.

At step 312, the VAS application receives the "GPO Request" including the MID associated with the merchant access device 120 and determines if the merchant access device 120 is supported or is associated with any of the loyalty information stored in the VAS application. For example, the VAS application may determine that the received MID is valid and that the MID is associated with one or more loyalty identifiers (LIDs) stored in the VAS application. The VAS application may then prepare and send any LIDs (e.g., a loyalty club number) or loyalty container data (LCD) information (e.g., a coupon, etc.) associated with the MID information in the GPO response.

Accordingly, the VAS application replies with a "GPO Response" including any relevant loyalty information which could be: (1) "specific" loyalty data for a given MID (e.g. coupons, club card number, etc.) or (2) "generic" loyalty data (e.g. email address, phone number, etc.) associated with the consumer. Therefore, the merchant access device 120 has been validated as being operated by an entity with associated data stored by the VAS application. Thus, the VAS application sends any loyalty identifiers and loyalty container data stored in the VAS to the merchant access device 120. Additional details may be found in reference to steps 206 of FIG. 2 described above.

At step 313, the merchant access device 120 may receive the data, apply the VAS application rules associated with the received loyalty information, and apply all the LCD information received (e.g., coupons and discounts) to the transaction. Thus, the pre-transaction VAS application process has completed and the transaction may continue to the payment stage.

3. Merchant Access Device Supports Trusted Applet Identifier

At step 314, the merchant access device 120 may decide whether to select the TAID or UAID associated with the mobile application 112 that was received and parsed from the PPSE response in step 308. If the merchant access device 120 selects a TAID, the flow moves to step 315. Otherwise, the flow diagram moves to step 317.

At step 316, the merchant access device 120 selects a TAID associated with a trusted account applet. This is a typical contactless payment transaction that currently exists and the merchant access device 120 sends a "Select TAID Request" command message to the mobile application 112 to prepare the appropriate data for processing of the transaction. For example, the mobile application 112 may respond with a "Select TAID Response" command and a typical card present face-to-face transaction may be initiated and processed as previously described above in reference to steps 202-208 of FIG. 2.

For example, payment data exchange may include a data payload configured for at least three different types of transactions depending on the mobile application 112, the merchant access device 120, and the selected cards. The payloads may include at least one of three options (CP, CNP, or 3D-Secure) based on the access device configuration options (i.e., TPO or access device configuration information) passed during the contactless communication exchange. Additional payment payload options may also be captured as one of ordinary skill would recognize.

4. Merchant Access Device Supports Untrusted Applet Identifier

However, some merchants may choose to use the UAID because it comes from a mobile application that they trust and/or because no TAIDs are present. Accordingly, at step 317, the merchant access device 120 may determine that the wallet identifier (WID) associated with the mobile application 112 is associated with an application that the merchant access device 120 supports. Thus, the merchant access device 120 may determine that the mobile application is their mobile application and/or was developed by a party they trust. As such, the access device 120 may determine that the merchant identifier (MID) is associated with a trusted entity before selecting the untrusted applet identifier from the list of available applets.

However, if the merchant access device 120 determines that they trust the mobile application associated with the MID, the merchant access device 120 may generate a "select UAID request" message and send the "select UAID request" message to the mobile application 112. In some embodiments, the merchant access device 120 may send the "Select UAID Request" command assuming that the merchant supports card-not-present (CNP) transactions (by means of selecting UAID) and that the merchant either recognized their WID (received in the "Select PPSE Response") or decided to accept payment data from somebody else's mobile application that they trust.

At step 318, the mobile application 112 receives the "Select UAID Request" and populates a PDOL with the relevant information. However, the mobile application 112 may ask the merchant access device 120 for the MID so that the mobile application 112 is not providing information to a merchant access device 120 that it does not support. Accordingly, before the merchant application provides the payment information to the merchant access device 120, the mobile application 112 may request the merchant access device's MID. Thus, the mobile application may ensure that the merchant access device 120 is associated with a merchant that developed the mobile application 112 or is a partner of the app developer before providing payment information to the merchant access device 120. Additional details may be found in reference to step 203 of FIG. 2 described above.

Additionally, the mobile application may also request access device configuration information (also referred to as "transaction processing options" (TPO)) from the merchant access device 120 to determine what processing options the merchant access device supports. Accordingly, the "Select UAID Response" may include two different questions to the merchant access device 120, (1) what is that MID and (2) what kind of modes of processing do you support?

At step 319, the merchant access device 120 may receive the "Select UAID Response" including the request for the TPO and the MID and may send a "GPO Request" with the MID and the TPO that are supported back to the mobile application 112. The TPO may include a bitmask of access device 120 supported contactless payment options. For example, the TPO may include a 3 digit indicator of "XYZ," where X indicates whether the reader is capable of accepting a mobile application 112 chip card present (CP) transaction payload, Y indicates a card-not present (CNP) transaction payload, and Z indicates an advanced authorization card-not present (e.g., 3D-Secure) transaction.

The type of information prepared and passed by the mobile application 112 during the transaction may be dependent upon the TPO. For example, if X==1 for the TPO, then the mobile application may set a CNP flag in the payment information so an issuer or payment network processing the transaction information can recognize that the transaction that looks like a regular card present (CP) transaction is in fact a CNP transaction. Further, if Y==1, then the mobile application may respond with CNP data (e.g., PAN, Expiration Date, CVV2) and a merchant sends the transaction using CNP transaction processing systems instead of CP systems. Finally, if Z==1, then the mobile application responds with 3DS data (e.g., a cardholder authenticated verification value (CAVV)) and the merchant may process the transaction using the 3DS data. The 3DS data may be validated by a payment network to ensure the included CAVV matches a value generated by the payment network.

At step 320, the mobile application receives the "GPO Request" message including the requested MID and the TPO from the merchant access device 120. The mobile application 112 receives the information and checks whether the merchant access device 120 is associated with a valid merchant for accessing the account applet associated with the UAID.

At step 321, the mobile application compares the entity identifier (e.g., MID) to the stored entity identifier directory (e.g., merchant identifier directory) to ensure the MID is correct and that the access device owner and/or operator is associated with the mobile application 112. If it is not, an error message is generated and sent to the merchant access device 120. Thus, the mobile application validates that the access device 120 is authorized to access the account credentials associated with the selected UAIDs using the entity identifier (e.g., MID) by comparing the entity identifier (e.g., MID) to a list of trusted entity identifiers (e.g., MIDs) associated with and stored in the mobile application.

At step 322, the mobile application determines if the access device 120 supports the TPO of the UAID that is selected. For example, if the mobile application can only process CNP transactions, but the access device 120 is not configured to process those types of transactions, an error would occur and the transaction would be terminated. Thus, the mobile application may validate that the access device 120 is configured to support transactions initiated using untrusted applet identifiers based on the access device configuration information.

As another example, if the TPO indicates that the merchant access device 120 only supports card present transactions, but an UAID is being selected, then the mobile application 112 may determine that the UAID transaction data is not supported by the merchant access device 120. Accordingly, a "GPO Response" may be sent to the merchant access device 120 including an error code. A TPO indicating only that a card present transaction is allowed may create an error because the UAID is untrusted and CNP transaction data may be used to process the transaction. Thus, the mobile application 112 may determine that it is only configured for card not present transactions and the mobile application is not ready for a card present transaction because a UAID was selected. Thus, the mobile application 112 checks both that the MID is valid and that the TPO from the merchant access device 120 support the type of transaction data associated with the applet of the UAID.

At step 323, if the merchant access device 120 receives error messages from steps 321 or 322 above, the transaction is terminated. An error message may be displayed informing the user and/or merchant of the problem.

At step 324A, the merchant access device 120 receives an appropriate "GPO Response" from the mobile application and the transaction is processed as indicated by the type of payment information passed according to the TPO options provided by the merchant access device 120. Accordingly, the mobile application 112 has determined that the merchant access device 120 is ready to take the payment data and that the merchant access device 120 is associated with a valid merchant. Therefore, a normal payment action is performed.

The transaction may be processed using any suitable processes. For example, at step 324B, the access device 120 and the mobile application 112 may perform a payment data exchange in order to allow the transaction to be processed. The payment data exchange may include any relevant steps to allow the access device 120 to generate and send an appropriate authorization request message for the transaction. As described above in reference to step 316 of FIG. 3C, the authorization request message may include different payloads based on the transaction processing option (TPO) of the access device 120. For example, the payloads may include at least one of three options (CP, CNP, or 3D-Secure) based on the access device configuration options (i.e., TPO or access device configuration information) passed during the contactless communication exchange. Additional details regarding the transaction processing may be found above in reference to payment data exchange may include similar functionality to that found in steps 206-208 of FIG. 2 described above.

5. Post-Payment VAS Processing

In some embodiments, a post-payment process may be used to pass information about the transaction, obtain VAS data from the transaction, or for any other purpose. The post-payment VAS processing may occur when the mobile device 110 interacts with the merchant access device 120 through a second tap or contactless communication initiation with the merchant access device 120. During the second tap, the VAS application may complete the same identification steps described above in regards to steps 309-313 described above. However, instead of obtaining loyalty information for application to the transaction, the merchant access device 120 may pass receipts and/or updated coupons/loyalty information to the mobile device 110. Additionally, the MID may be passed with the LCD and the receipt to ensure the correct LID is accessed by the mobile device 110. The VAS application may save the LCD information to the memory of the mobile device 110.

At step 325, the merchant access device 120 (if it supports VAS for post-payment interaction requests) may ask the consumer to present their mobile device 110 again and may send a "Select VAID Request" command. A similar check using the MID as described above in reference to FIG. 3B may be performed.

At step 326, the VAS application responds with "Select VAID Response" and includes a request for LCDs, Receipts, VAS Status and any other loyalty information in a PDOL command. However, in the post-payment process the VAS Status should be set, for example, to 0 indicating that the VAS application is ready to accept information from the reader.

At step 327, the reader sends VAS data in a GPO Request command. The GPO Request command may include LCDs, a receipt, or any other relevant data to the VAS application. The data such as LCDs and a receipt could also be URLs pointing to where such data can be downloaded from the web.

At step 328, the mobile application responds with GPO Response that includes confirmation of a successful interaction.

At step 329, the access device 120 receives the GPO Response and determines that the transaction is completed.

C. Exemplary Transaction Processing System

Figure 4:
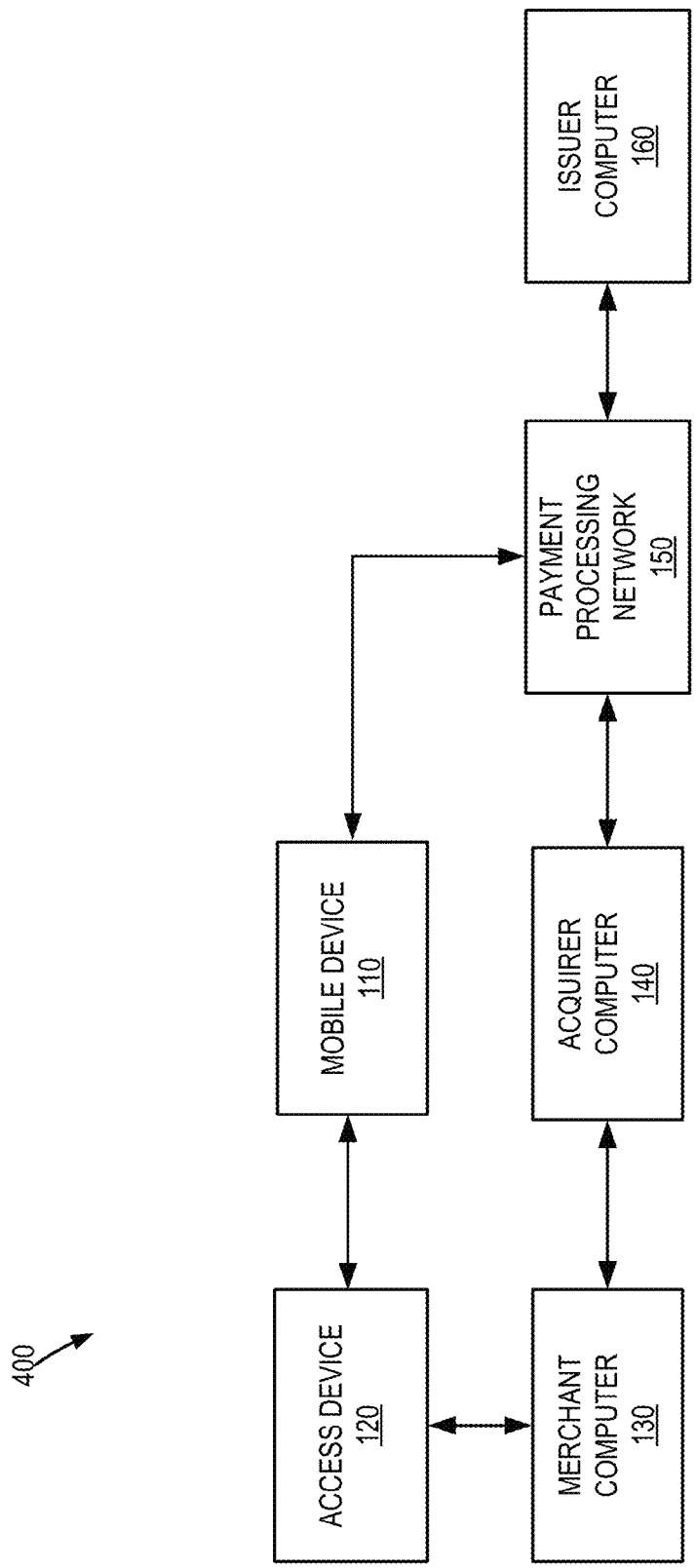
FIG. 4 illustrates a transaction processing system, according to one embodiment of the present invention.

FIG. 4 illustrates an exemplary transaction processing system 400 according to an exemplary embodiment of the invention. FIG. 4 shows a functional block diagram illustrating the primary functional elements of an exemplary transaction processing system incorporating a portable communication device and access device 120 including enhanced data interface functionality. It is to be understood that embodiments of the invention may include more than one of the components shown individually in FIG. 4. Additionally, some embodiments of the invention may include fewer than all of the components shown in FIG. 4.

The exemplary transaction processing system may include a consumer (not shown), a mobile device 110 associated with the consumer (or other account holder), an access device 120, a merchant computer 130, an acquirer computer 140, a payment processing network computer 150, and an issuer computer 160. The various computers may be configured to communicate in any suitable manner using any suitable communication network. Although the entities are shown as coupled to particular entities, the entities may be configured to communicate through any other suitable interfaces and some entities may be removed and/or added to the system depending on the configuration of the system.

In the following description, an "acquirer" is typically a business entity (e.g., a commercial bank) that has a business relationship with a particular merchant. An "issuer" is typically a business entity (e.g., a bank or credit union) which issues a payment device (such as a credit card, debit card, smart card, prepaid device or contactless device) to an account owner and which provides administrative and management functions for the payment account. Some entities may perform both issuer and acquirer functions. A payment account may be any account usable in a transaction, such as a credit, debit or prepaid account.

In a typical transaction, a payment device such as a mobile device 110 (also referred to as a "portable communication device") or a portable consumer device, interfaces with an access device 120 (or, in some embodiments, with merchant computer 130) to initiate a transaction. Specific examples of portable consumer devices include payment cards such as smartcards with chips, debit devices (e.g., a debit card), credit devices (e.g., a credit card), or stored value devices (e.g., a stored value card or "prepaid" card).

As described above in reference to FIGS. 1-3E, the mobile device 110 and access device 120 use an enhanced data interface communication protocol to select and obtain credentials and/or account information (e.g., payment account identifier, cryptogram, loyalty information, etc.) associated with a selected mobile application 112 and/or value added services (VAS) application 114.

After the access device 120 receives the credentials (e.g., payment account identifier), the access device 120 or the merchant computer 130 in communication with the access device 120 generates an authorization request message for the transaction. The data included in the authorization request message (also referred to as an "authorization request") may include data obtained from a portable communication device 110 as well as other data related to the transaction, the payment account holder, or the merchant, such as one or more of a payment account number, the payment device expiration date, a currency code, the sale amount, a merchant transaction stamp, the acceptor city, the acceptor state/country, etc.

An authorization request message may be protected using a secure encryption method (e.g., 128-bit SSL or equivalent) in order to prevent data from being compromised. In one embodiment, the authorization request message is a standardized interchange message such as an International Organization for Standardization (ISO) 8583 message. An ISO 8583 message includes a message type indicator; one or more bitmaps indicating which data elements are present in the message, and data elements of the message. The authorization request message may comprise routing information as part of or in addition to the interchange message. As part of generating the authorization request message, merchant computer 130 may communicate with a database which stores data such as data regarding the account owner, the payment device, or the account owner's transaction history with the merchant. The merchant computer 130 (or access device 120) transmits the authorization request message to the acquirer computer 140. Acquirer computer 140 then transmits the authorization request to a payment processing network 150.

A payment processing network 150, also referred to as a "payment network," is a system that may comprise one or more servers, data processing subsystems, networks, and operations used to support and deliver authorization services, exception file services, and clearing and settlement services. A payment processing network may be able to process one or more of credit card transactions, debit card transactions or any other type of commercial transaction. An exemplary payment processing network may include, for example, VisaNet™. Although the system of FIG. 4 only shows one payment processing network, any number of payment processing networks may be implemented in the transaction ecosystem to allow the merchant computer 130 to determine the payment processing network 150 that they support and select the appropriate mobile application 112 associated with the one or more payment processing networks.

The payment processing network 150 transmits the authorization request message to an issuer computer 160. The issuer computer 160 generates an authorization response message indicating whether the transaction was authorized. The authorization response message is routed back to the merchant computer 130. The authorization response may be displayed by the access device 120 (e.g., a POS terminal), transferred to the portable communication device 110, printed on a receipt, or otherwise conveyed to the payment account holder.

At the end of the day, a normal clearing and settlement process can be conducted by each of the payment processing network. A clearing process is a process of exchanging financial details between an acquirer and an issuer to facilitate posting to the payment account holder's account and reconciliation of the consumer's settlement position. Clearing and settlement can occur simultaneously.

The term "computer" as used herein refers to a system comprising a processor and a computer readable medium, such as computer memory or other data storage device, coupled to the processor. The computer readable medium stores code executable by the processor.

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

D. System Devices

Figure 5:
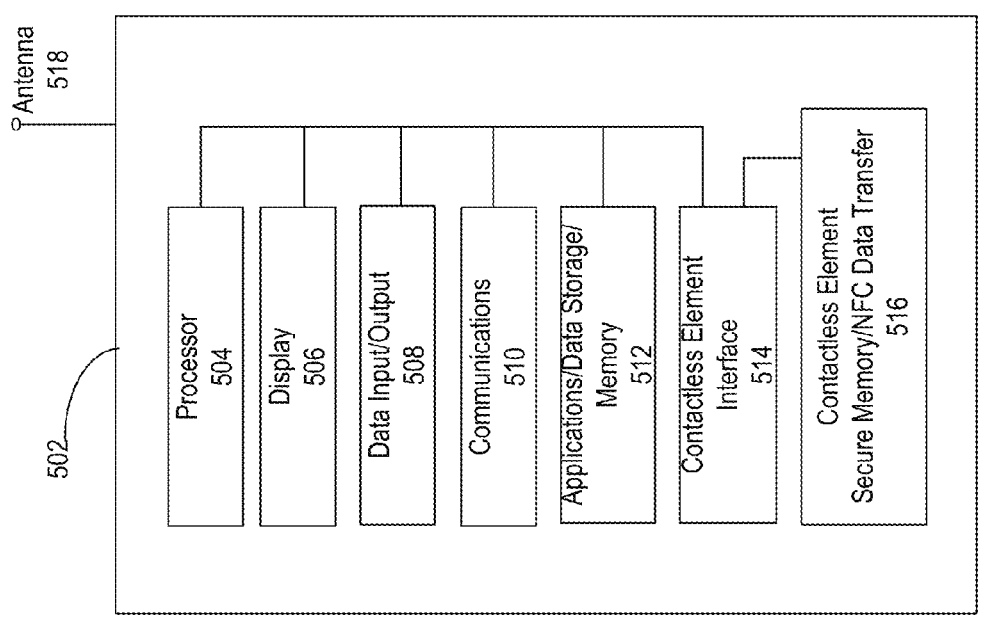
FIG. 5 illustrates a block diagram of a mobile device.

FIG. 5 is a functional block diagram illustrating a portable communication device 502 that may be used to perform mobile banking operations, such as initiating transactions and receiving and displaying transaction alerts, in accordance with some embodiments of the present invention. Portable communication device 502 may include circuitry that is used to enable certain device functions, such as telephony. The functional elements responsible for enabling those functions may include a processor 504 that is programmed to execute instructions that implement the functions and operations of the device. Processor 504 may access data storage 512 (or another suitable memory region or element) to retrieve instructions or data used in executing the instructions. Data input/output elements 508 may be used to enable a user to input data (via a microphone or keyboard, for example) or receive output data (via a speaker, for example). Display 506 may also be used to output data to a user. Communications element 510 may be used to enable data transfer between device 502 and a wireless network (via antenna 518, for example) to assist in enabling telephony and data transfer functions. Device 502 may also include contactless element interface 514 to enable data transfer between contactless element 516 and other elements of the device, where contactless element 516 may include a secure memory and a near field communications data transfer element (or another form of short range communications technology). As noted, a mobile phone or similar device is an example of a portable communication device that may be used to display alerts as described with reference to embodiments of the present invention. However, other forms or types of devices may be used without departing from the underlying concepts of the invention. Further, devices that are used to display alerts may not require the capability to communicate using a cellular network in order to be suitable for use with embodiments of the present invention.

Figure 6:
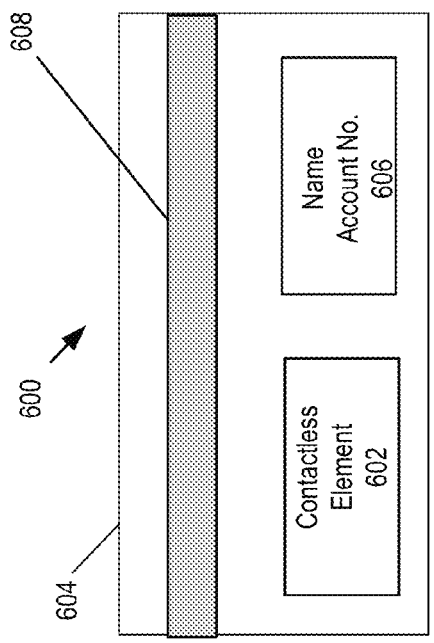
FIG. 6 illustrates a block diagram of a portable consumer device.

FIG. 6 is a diagram of a portable consumer device 600 in the form of a card that includes a contactless payment element 602, and that may be used to initiate a transaction, in accordance with some embodiments of the present invention. The payment device depicted in FIG. 6 may be a "smart card" or similar device, such as a credit or debit type card in which a chip is embedded. One form of such a device is known as an EMV (Europay™, MasterCard™ and Visa™) card. In the context of the present invention, EMV refers to a standard for interoperation of IC cards ("chip cards") and IC card capable POS terminals and ATMs, and is used for authenticating credit and debit card payments. The EMV standard defines the interactions at the physical, electrical, data and application levels between IC cards and IC card processing devices for use in financial transactions.

FIG. 6 shows a substrate 604 that provides the form factor for device 600. A contactless element 602 for interfacing with a data access or data transfer device may be present on, or embedded within, substrate 604. Contactless element 602 may include a chip or other form of data storage element. Contactless element 602 may include the capability to communicate and transfer data using a near field communications (NFC) technology or other short range communications technology. Consumer information 606 such as an account number, expiration date, and consumer name may be printed or embossed on the card. Although not necessary for operation as a contactless payment device, device 600 may include a magnetic stripe 608 on substrate 604, where magnetic stripe 608 permits access to contactless element 602. This may be used to provide access to data stored in, or the functions of, the chip that is part of the contactless element by a terminal using a magnetic stripe reader.

The various participants and elements described herein with reference to FIGS. 1-4 may operate one or more computer apparatuses to facilitate the functions described herein. Any of the elements in FIGS. 1-4, including any servers or databases, may use any suitable number of subsystems to facilitate the functions described herein.

Figure 7:
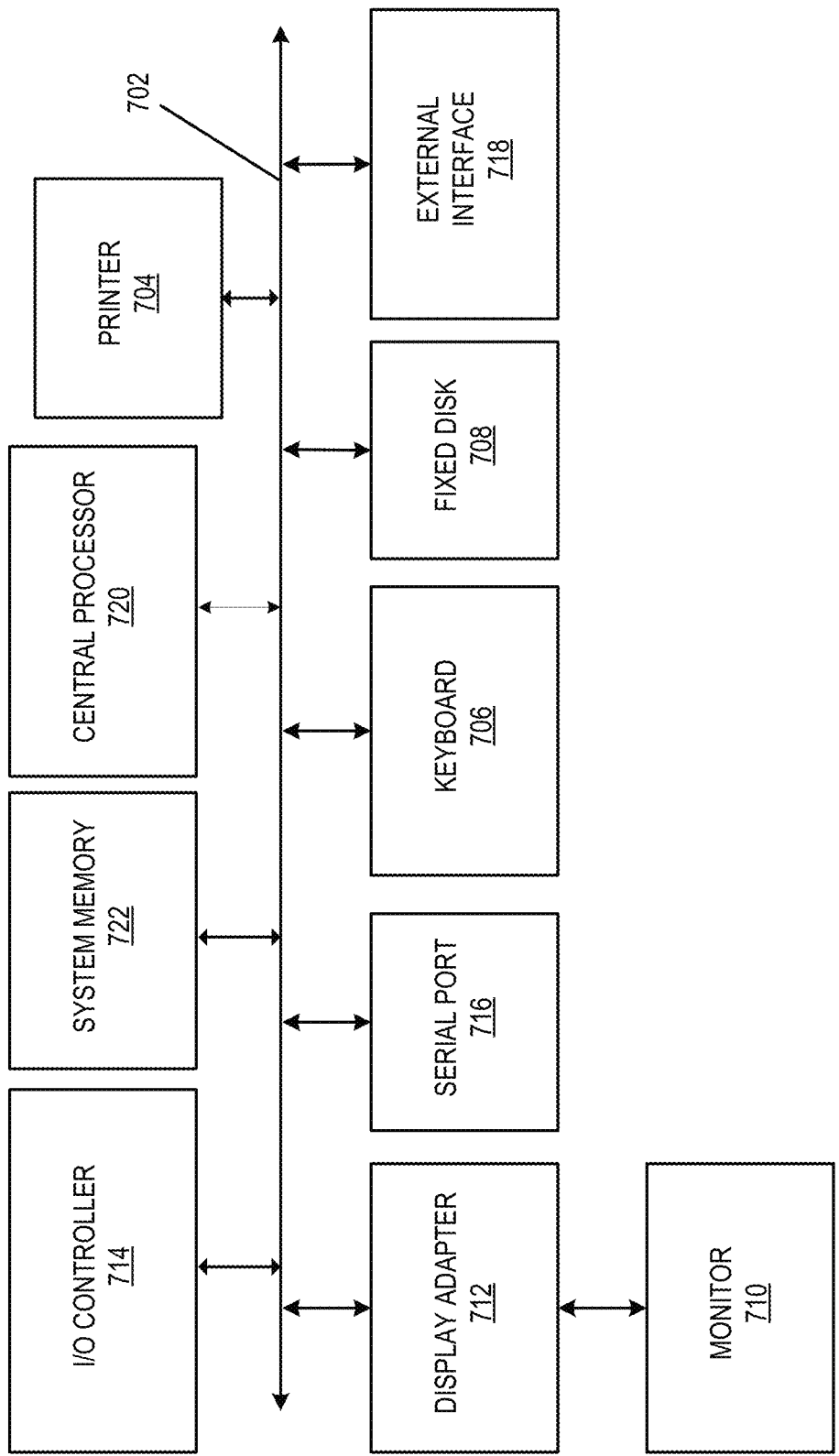
FIG. 7 illustrates a block diagram of a computer apparatus.

Examples of such subsystems or components are shown in FIG. 7. The subsystems shown in FIG. 7 are interconnected via a system bus 702. Additional subsystems such as a printer 704, keyboard 706, fixed disk 708 (or other memory comprising computer readable media), monitor 710, which is coupled to display adapter 712, and others are shown. Peripherals and input/output (I/O) devices, which couple to I/O controller 714 (which can be a processor or other suitable controller), can be connected to the computer system by any number of means known in the art, such as serial port 716. For example, serial port 716 or external interface 718 can be used to connect the computer apparatus to a wide area network such as the Internet, a mouse input device, or a scanner. The interconnection via system bus 50 allows the central processor 720 to communicate with each subsystem and to control the execution of instructions from system memory 722 or the fixed disk 708, as well as the exchange of information between subsystems. The system memory 722 and/or the fixed disk 708 may embody a computer readable medium.

Embodiments of the invention are not limited to the above-described embodiments. For example, although separate functional blocks are shown for an issuer, payment processing network, and acquirer, some entities perform all of these functions and may be included in embodiments of invention.

Specific details regarding some of the above-described aspects are provided above. The specific details of the specific aspects may be combined in any suitable manner without departing from the spirit and scope of embodiments of the invention. For example, back end processing, data analysis, data collection, and other transactions may all be combined in some embodiments of the invention. However, other embodiments of the invention may be directed to specific embodiments relating to each individual aspect, or specific combinations of these individual aspects.

It should be understood that the present invention as described above can be implemented in the form of control logic using computer software (stored in a tangible physical medium) in a modular or integrated manner. Based on the disclosure and teachings provided herein, a person of ordinary skill in the art may know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   sending, by an hardware access device, a request for available applets to a hardware mobile device;
   receiving, by the hardware access device, a list of available applets including trusted applet identifiers and untrusted applet identifiers, the list of available applets including a wallet identifier for each of the available applets, wherein the wallet identifier identifies a mobile application that is associated with each of the available applets, and wherein an untrusted applet identifier indicates that an issuer associated with credentials of a corresponding applet did not participate in provisioning of the corresponding applet;
   determining, by the hardware access device, supported applet identifiers from the list of available applets;
   determining, by the hardware access device, that a highest priority applet of the supported applet identifiers includes an untrusted applet identifier by comparing the highest priority applet identifier to a directory of trusted applet identifiers and untrusted applet identifiers, and matching the highest priority applet identifier to an untrusted applet identifier within the directory;

validating, by the hardware access device, that the wallet identifier is associated with a trusted entity before selecting the untrusted applet from the list;

providing, by the hardware access device, a selection of the untrusted applet identifier from the list;

providing, by the hardware access device, an entity identifier associated with the hardware access device to the hardware mobile device, wherein the mobile application of the hardware mobile device validates that the hardware access device is authorized to access the credentials associated with the selected untrusted applet identifier using the entity identifier by comparing the entity identifier to a list of trusted entity identifiers associated with the mobile application; and receiving, by the hardware access device, credentials associated with the selected untrusted applet identifier from the mobile application of the hardware mobile device.

2. The method of claim 1, wherein determining supported applet identifiers from the list of available applets comprises:

matching, by the hardware access device, each of the applet identifiers in the list of available applets to a list of supported applet identifiers stored in the hardware access device; and storing, by the hardware access device, each of the matching applet identifiers as one of the supported applet identifiers in order of priority indicated by the hardware mobile device.

3. The method of claim 1, wherein before receiving the credentials associated with the selected untrusted applet identifier, the method further comprises:

providing, by the hardware access device, hardware access device configuration information, wherein the mobile application validates that the hardware access device is configured to support transactions initiated using untrusted applet identifiers based on the hardware access device configuration information.

4. The method of claim 1, wherein the received credentials associated with the selected untrusted applet identifier include an untrusted applet indicator, wherein the untrusted applet indicator allows entities to identify the credentials as being associated with an untrusted applet.

5. The method of claim 1, wherein the list of available applets further comprises a multiple entity applet identifier, wherein the method further comprises:

determining, by the hardware access device, that the multiple entity applet identifier is supported by the hardware access device;

providing, by the hardware access device, a selection of the multiple entity applet to the hardware mobile device;

providing, by the hardware access device, an entity identifier associated with the hardware access device, wherein the multiple entity applet associated with the multiple entity applet identifier uses the entity identifier to determine relevant information to the entity associated with the hardware access device; and receiving, by the hardware access device, the relevant information.

6. A system comprising:

a hardware mobile device configured to:

receive a request for available applets from an hardware access device;

provide a list of available applets including trusted applet identifiers and untrusted applet identifiers to the hardware access device, wherein an untrusted applet identifier indicates that an issuer associated with credentials of a corresponding applet did not participate in provisioning of the corresponding applet;

receive a selection of an untrusted applet identifier from the list and an entity identifier associated with the hardware access device;

validate that the hardware access device is authorized to access credentials associated with the selected untrusted applet identifier using the entity identifier by comparing the entity identifier to a list of trusted entity identifiers associated with the mobile application; and provide the credentials associated with the selected untrusted applet identifier to the hardware access device; and the hardware access device configured to:

send the request for available applets to the hardware mobile device;

receive the list of available applets including the trusted applet identifiers and the untrusted applet identifiers;

determine that a highest priority applet of the supported applet identifiers includes an untrusted applet identifier by comparing the highest priority applet identifier to a directory of trusted applet identifiers and untrusted applet identifiers, and matching the highest priority applet identifier to an untrusted applet identifier within the directory;

provide the selection of the untrusted applet identifier from the list;

provide an entity identifier associated with the hardware access device to the hardware mobile device; and receive credentials associated with the selected untrusted applet identifier from the mobile application of the hardware mobile device.

7. The system of claim 6, wherein the list of available applets including a wallet identifier for each of the available applets, wherein the wallet identifier identifies a mobile application that is associated with each of the available applets, and wherein the hardware access device is further configured to:

determine supported applet identifiers from the list of available applets; and validate that the wallet identifier is associated with a trusted entity before selecting the untrusted applet from the list.

8. The system of claim 6, wherein the hardware mobile device is further configured to:

determine a status for each of the one or more applets as being a trusted applet or an untrusted applet based on a provisioning process associated with each of the one or more applets;

categorize an applet identifier for each of the one or more applets as trusted applet identifiers or untrusted applet identifiers based on the status for each of the one or more applets; and generate the list of available applets including the trusted applet identifiers and the untrusted applet identifiers.

9. The system of claim 6, wherein the hardware mobile device is further configured to:

receive hardware access device configuration information; and validate that the hardware access device is configured to support transactions initiated using untrusted applet identifiers based on the hardware access device configuration information.

10. The system of claim 6, wherein the provided credentials associated with the selected untrusted applet include an untrusted applet indicator, wherein the untrusted applet indicator allows entities relying on transaction information within a transaction payload to identify the transaction as being initiated using an untrusted applet.

11. An hardware access device comprising:
   a contactless interface to interact with a hardware mobile device; and
   an application selection software module configured to:
   send a request for available applets to a hardware mobile device;
   receive a list of available applets including trusted applet identifiers and untrusted applet identifiers, the list of available applets including a wallet identifier for each of the available applets, wherein the wallet identifier identifies a mobile application that is associated with each of the available applets, and wherein an untrusted applet identifier indicates that an issuer associated with credentials of a corresponding applet did not participate in provisioning of the corresponding applet;
   determine supported applet identifiers from the list of available applets;
   determine that a highest priority applet of the supported applet identifiers includes an untrusted applet identifier by comparing the highest priority applet identifier to a directory of trusted applet identifiers and untrusted applet identifiers, and matching the highest priority applet identifier to an untrusted applet identifier within the directory;
   validate that the wallet identifier is associated with a trusted entity before selecting the untrusted applet from the list;
   provide a selection of the untrusted applet identifier from the list;
   provide an entity identifier associated with the hardware access device to the hardware mobile device, wherein the mobile application of the hardware mobile device validates that the hardware access device is authorized to access the credentials associated with the selected untrusted applet identifier using the entity identifier by comparing the entity identifier to a list of trusted entity identifiers associated with the mobile application; and
   receive credentials associated with the selected untrusted applet identifier from the mobile application of the hardware mobile device.

12. The hardware access device of claim 11, wherein the application selection software module is further configured to:
   match each of the applet identifiers in the list of available applets to a list of supported applet identifiers stored in the hardware access device; and
   store each of the matching applet identifiers as one of the supported applet identifiers in order of priority indicated by the hardware mobile device.

13. The hardware access device of claim 11, wherein the application selection software module is further configured to:
   provide hardware access device configuration information to the hardware mobile device, wherein the mobile application validates that the hardware access device is configured to support transactions initiated using untrusted applet identifiers based on the hardware access device configuration information.

14. The hardware access device of claim 11, wherein the received credentials associated with the selected untrusted applet identifier include an untrusted applet indicator, wherein the untrusted applet indicator allows entities to identify the credentials as being associated with an untrusted applet.

15. The hardware access device of claim 11, wherein the list of available applets further comprises a multiple entity applet identifier, and the application selection software module is further configured to:
   determine that the multiple entity applet identifier is supported by the hardware access device;
   provide a selection of the multiple entity applet to the hardware mobile device;
   provide an entity identifier associated with the hardware access device, wherein the multiple entity applet associated with the multiple entity applet identifier uses the entity identifier to determine relevant information to the entity associated with the hardware access device; and
   receive the relevant information.

\* \* \* \* \*

UNITED STATES PATENT AND TRADEMARK OFFICE
CERTIFICATE OF CORRECTION

| | |
|---|---|
| PATENT NO. | : 9,491,626 B2 |
| APPLICATION NO. | : 14/706818 |
| DATED | : November 8, 2016 |
| INVENTOR(S) | : Sanjeev Sharma et al. |

It is certified that error appears in the above-identified patent and that said Letters Patent is hereby corrected as shown below:

On the Title Page

Page 1, Column 1 in the (73) Assignee section, please delete "Visa Intellectual Service Association"

And insert
--Visa International Service Association--

Signed and Sealed this
Seventeenth Day of January, 2017

Michelle K. Lee
*Director of the United States Patent and Trademark Office*